(12) United States Patent
Kobayashi et al.

(10) Patent No.: US 7,373,788 B2
(45) Date of Patent: May 20, 2008

(54) EXPANSION VALVE

(75) Inventors: Kazuto Kobayashi, Tokyo (JP); Eiji Fukuda, Tokyo (JP); Kazuhiko Watanabe, Tokyo (JP); Masamichi Yano, Tokyo (JP); Makoto Sudo, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 429 days.

(21) Appl. No.: 11/127,218

(22) Filed: May 12, 2005

(65) Prior Publication Data

US 2005/0252238 A1    Nov. 17, 2005

(30) Foreign Application Priority Data

May 17, 2004   (JP)   ............................. 2004-146294
Jul. 14, 2004   (JP)   ............................. 2004-207257

(51) Int. Cl.
*F25D 19/00* (2006.01)
*F25B 41/06* (2006.01)

(52) U.S. Cl. ......................................... 62/296; 62/527

(58) Field of Classification Search .................. 62/222, 62/527, 296; 236/92 B; 32/222, 527, 296
See application file for complete search history.

(56) References Cited

U.S. PATENT DOCUMENTS

| | | | |
|---|---|---|---|
| 2,573,522 A | | 10/1951 | Watt |
| 2,832,573 A | * | 4/1958 | Rees ........................... 366/142 |
| 3,738,120 A | | 6/1973 | Beatenbough |
| 5,924,299 A | * | 7/1999 | Karl ............................. 62/225 |
| 5,943,871 A | * | 8/1999 | Ito et al. ...................... 62/225 |
| 6,012,301 A | * | 1/2000 | Fujimoto et al. ............. 62/225 |
| 6,062,484 A | * | 5/2000 | Eybergen ................... 236/92 B |
| 6,354,509 B1 | * | 3/2002 | Fukuda et al. ............ 236/92 B |
| 6,868,684 B2 | * | 3/2005 | Law et al. ..................... 62/225 |
| 6,892,953 B2 | * | 5/2005 | Matsuda et al. .......... 236/92 B |

FOREIGN PATENT DOCUMENTS

| | | |
|---|---|---|
| EP | 0 691 517 A1 | 1/1996 |
| EP | 0 959 310 A2 | 11/1999 |
| EP | 1 384 962 A2 | 1/2004 |
| EP | 1 416 236 A1 | 5/2004 |
| JP | 5-157405 A   * | 6/1993 |
| JP | 2002-310538 A | 10/2002 |

OTHER PUBLICATIONS

European Search Report, Application No. 05009181.8-2422 PCT/, dated Sep. 6, 2005.

* cited by examiner

*Primary Examiner*—Mohammad M. Ali
(74) *Attorney, Agent, or Firm*—Rader, Fishman & Grauer, PLLC

(57) ABSTRACT

An expansion valve includes a valve body having a valve body hole, a first passage, a bottomed valve chamber, a second passage, a third passage and a guide member disposed in the valve body hole between the first passage and the third passage. The valve body hole has a first valve body hole portion and a second valve body hole portion of different diameters forming a valve body step between the second passage and the first passage. The guide has a first guide portion and a second guide portion of different diameters forming a guide portion step. The guide is sized to be slidably received by the valve body hole in a close-fitting relationship with the first valve body hole portion receiving the first guide portion, the second valve body hole portion receiving the second guide portion and the valve body step and the guide portion step contacting each other.

13 Claims, 23 Drawing Sheets

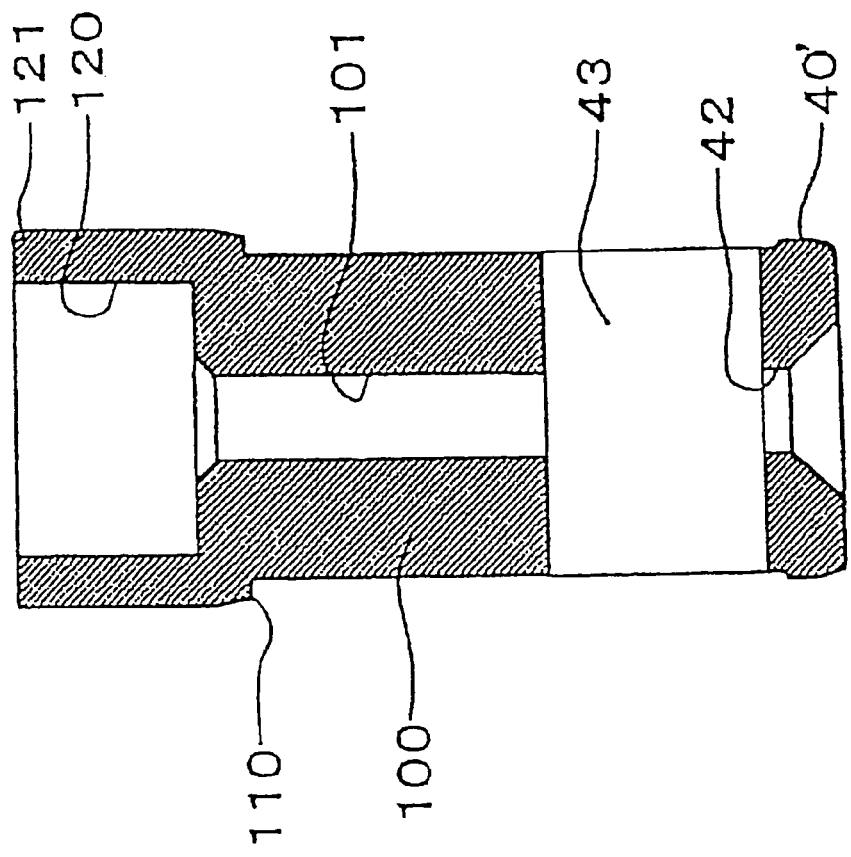
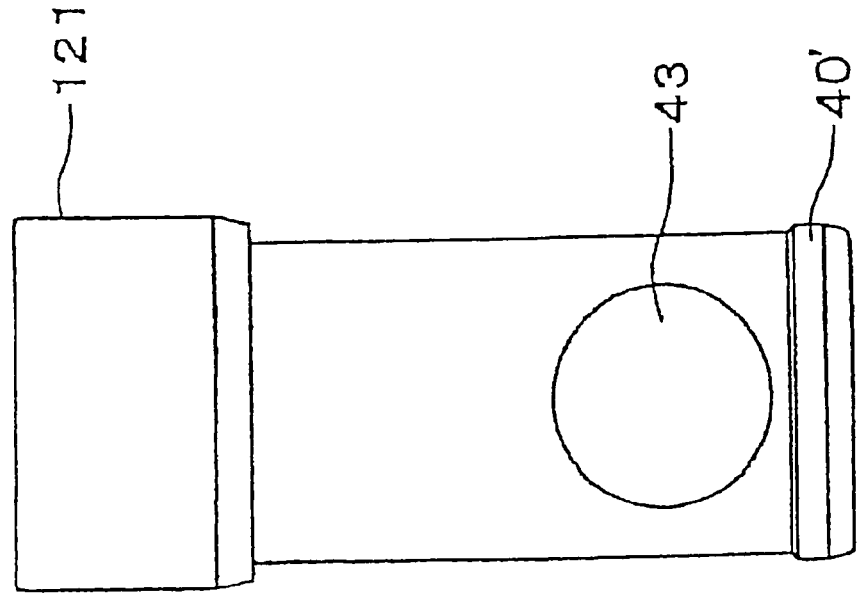

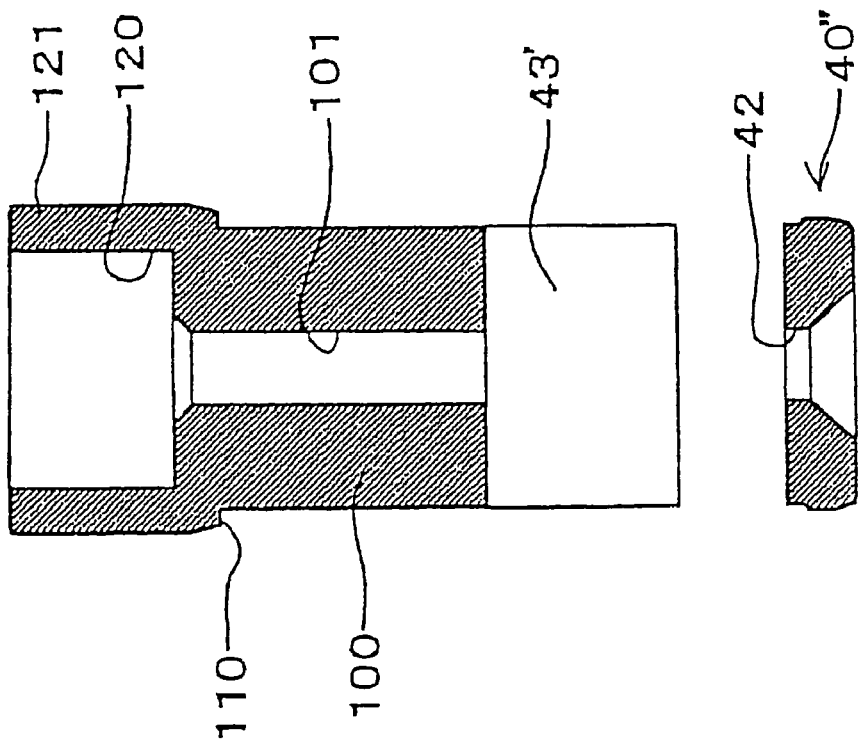
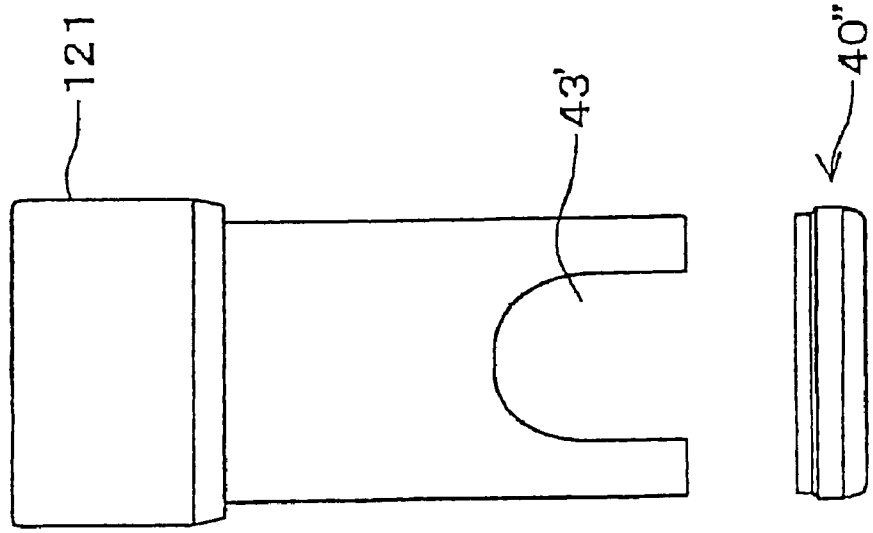

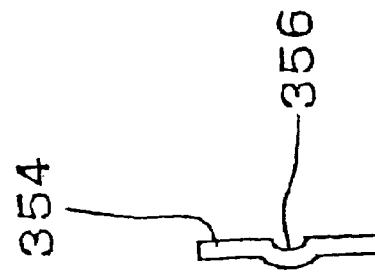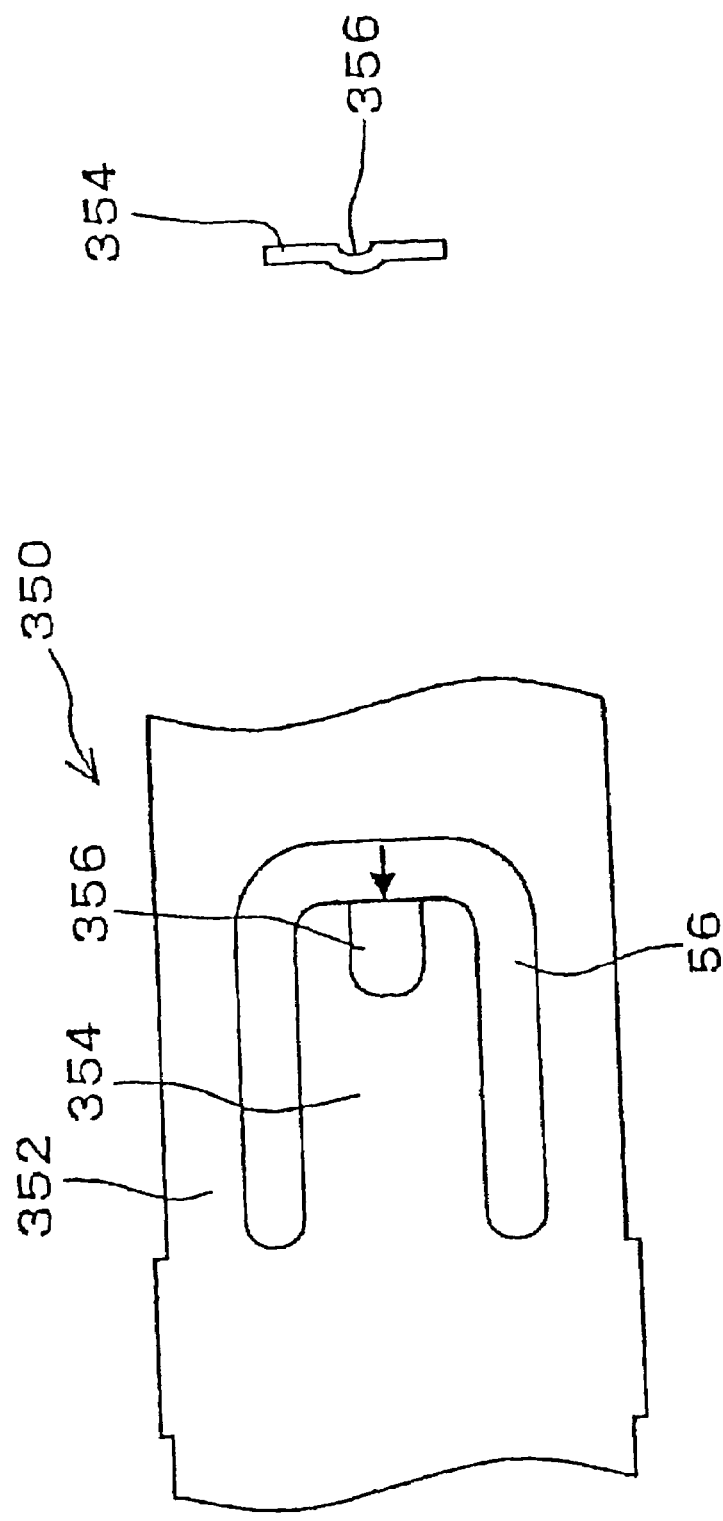

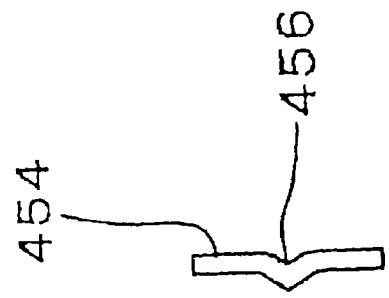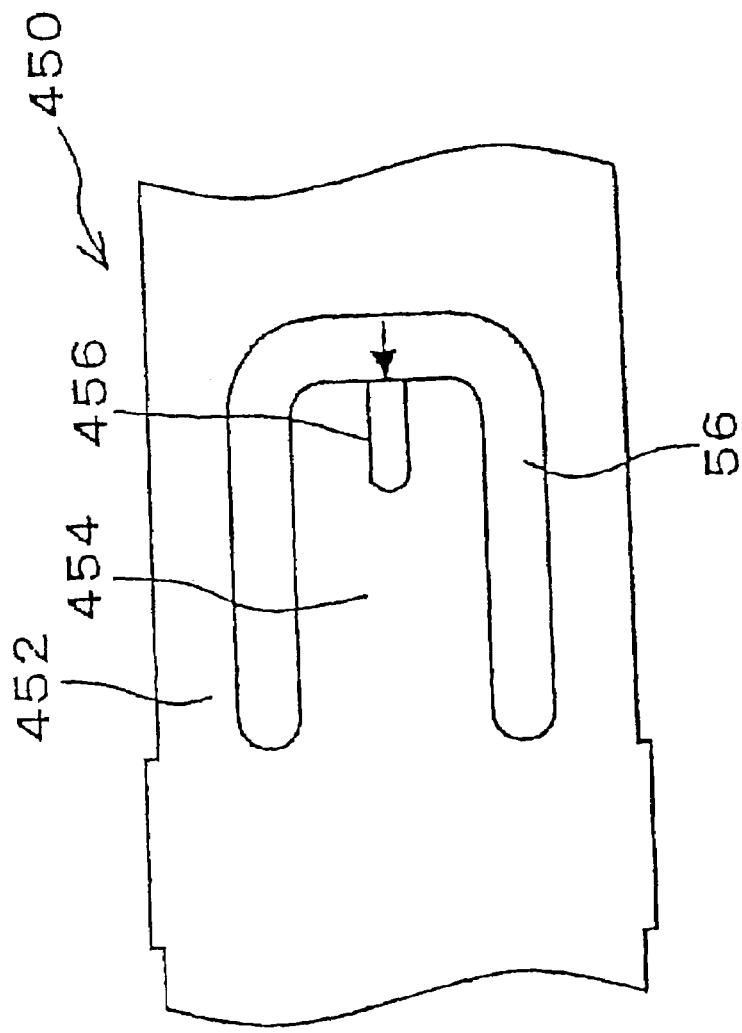

EXPANSION VALVE

The present application is based on and claims priority of Japanese patent applications No. 2004-146294 filed on May 17, 2004, and No. 2004-207257 filed on Jul. 14, 2004, the entire contents of which are hereby incorporated by reference.

BACKGROUND OF THE INVENTION

1. Field of the Invention

The present invention relates to an expansion valve which is mounted in an air conditioner for an automobile and the like for controlling the flow rate of a refrigerant supplied to an evaporator according to the temperature of the refrigerant.

2. Description of the Related Art

An expansion valve of this type has been disposed, for example, in Japanese Patent Laid-Open Publication No. 2002-310538 (Patent Document 1).

The conventional expansion valve disclosed in Patent Document 1 requires a large number of parts such as a valve receiving member, a spring, and an adjusting screw, so that it is difficult to achieve the miniaturization and lightweight of expansion valve.

Furthermore, there is a fear that a refrigerant leaks from a valve chamber through an adjusting screw portion.

SUMMARY OF THE INVENTION

Accordingly, an object of the present invention is to provide an expansion valve in which the construction thereof is simplified to meet the demand for compactness and lightweight of an air conditioner for an automobile, and the manpower for assembly is decreased.

In addition, another object of the present invention is to provide an expansion valve capable of achieving stabilization of valve motion with respect to fluctuations in pressure of a high-pressure refrigerant by using simple and low-cost means.

Moreover, further object of the present invention is to provide an expansion valve, in the state in which the above-described objects are achieved, with a space (wall thickness) with respect to a mounting hole for mounting the expansion valve to an evaporator and the like secured without causing corrosion of a valve body, and without fearing leakage of refrigerant.

Furthermore, another object of the present invention is to provide an expansion valve in which by threadedly engaging an external thread portion of a mounting seat for a can body of a driving device with an internal thread portion of a driving device mounting hole of a valve body, the driving device is installed in the driving device mounting hole of the valve body, and a seal member is brought into close contact with the outer periphery of the mounting seat for the can body of the driving device, by which leakage of a refrigerant from between the inner periphery of the driving device mounting hole of the valve body and the outer periphery of the mounting seat for the can body of the driving device can be prevented, and by rotating the external thread portion of the mounting seat for the can body of the driving device in the tightening direction or the loosening direction with respect to the internal thread portion of the driving device mounting hole of the valve body, an operation rod can be moved vertically together with the driving device, and a set value for starting the opening of a valve element can be finely adjusted by the amount of engagement of the external thread portion of the mounting seat for the can body of the driving device with the internal thread portion of the driving device mounting hole of the valve body.

To achieve the above objects, the present invention takes the measures described below.

An expansion valve of a first aspect of the invention includes a valve body, a first passage formed in the valve body through which a high-pressure refrigerant passes, a bottomed valve chamber formed in the first passage, a second passage formed in parallel with the first passage in the valve body through which a refrigerant sent out to the evaporator side passes, a third passage for allowing a refrigerant sent out from the evaporator side to pass through, and a guide member arranged in an opening portion of the valve body, and is characterized in that in the guide member, a guide portion, which slidably guides an operation rod for opening and closing a valve element, and an orifice portion, which has a throttle portion for causing the valve chamber and the second passage to communicate with each other are formed integrally, a passage communicating with the second passage is formed between the guide portion and the orifice portion, the valve element is arranged so as to be opposed to the throttle portion, and the operation rod is driven by a driving device mounted on the valve body.

An expansion valve of a second aspect of the invention is characterized in that, in the expansion valve of the first aspect of the invention, the guide member is fixed by staking to the valve body.

An expansion valve of a third aspect of the invention is characterized in that, in the expansion valve of the first aspect of the invention, the guide member forms the valve body and a positioning portion.

An expansion valve of a fourth aspect of the invention is characterized in that, in the expansion valve of the third aspect of the invention, the positioning portion is formed by a step portion of the guide member.

An expansion valve of a fifth aspect of the invention is characterized in that, in the expansion valve of the first aspect of the invention, the orifice portion is inserted under pressure in the valve body.

An expansion valve of a sixth aspect of the invention is characterized in that, in the expansion valve of the fourth aspect of the invention, the step portion abuts on the valve body in a state in which it is maintained by sealing.

An expansion valve of a seventh aspect of the invention is characterized in that, in the expansion valve of the sixth aspect of the invention, the abutting portion is fixed to the valve body by surface contact.

An expansion valve of an eighth aspect of the invention is characterized in that, in the expansion valve of the first aspect of the invention, the orifice portion of the guide member forms the valve body and a positioning portion.

An expansion valve of a ninth aspect of the invention is characterized in that, in the expansion valve of the eighth aspect of the invention, the positioning portion is formed by a step portion of the valve body.

An expansion valve of a tenth aspect of the invention is characterized in that, in the expansion valve of the eighth or the ninth aspect of the invention, the guide member is fixed by staking to the valve body.

An expansion valve of an eleventh aspect of the invention is characterized in that, in the expansion valve of any one of the first to the tenth aspects of the invention, the guide member is provided with a vibration isolating member abutting on the operation rod.

An expansion valve of a twelfth aspect of the invention is characterized in that, in the expansion valve of any one of the first to the eleventh aspects of the invention, at least a part of a large-diameter portion of the guide member, which incorporates the vibration isolating member, is arranged in the third passage.

An expansion valve of a thirteenth aspect of the invention is characterized in that, in the expansion valve of the twelfth aspect of the invention, a seal groove is formed at the outer periphery of the orifice portion, and a ring seal is arranged in the seal groove.

An expansion valve of a fourteenth aspect of the invention is characterized in that, in the expansion valve of any one of the first to the thirteenth aspects of the invention, the valve body is formed with a driving device mounting hole, which communicates with the third passage, for mounting the driving device, an annular groove and an internal thread portion are formed at the inner periphery of the driving device mounting hole in the valve body, the driving device has a can body fixed to the driving device mounting hole in the valve body, the can body of the driving device is integrally formed with a cylindrical mounting seat fitted in the driving device mounting hole in the valve body, an external thread portion threadedly engaged with the internal thread portion of the driving device mounting hole in the valve body is formed at the outer periphery of a tip end part of the mounting seat of the driving device, and a seal member in close contact with the outer peripheral surface of the mounting seat of the driving device is arranged in the annular groove of the driving device mounting hole in the valve body.

An expansion valve of a fifteenth aspect of the invention is characterized in that, in the expansion valve of the fourteenth aspect of the invention, the seal member is an O-ring.

An expansion valve of a sixteenth aspect of the invention is characterized in that, in the expansion valve of the fourteenth aspect of the invention, in the can body of the driving device, a diaphragm displaced by sensing the temperature of a refrigerant sent out of the evaporator and a stopper member for transmitting the displacement of the diaphragm to the operation rod are provided, a cylindrical hollow protrusion is integrally formed on the stopper member, a proximal end part of the operation rod is inserted in the hollow protrusion of the stopper member, and a distal end of the operation rod abuts on the valve element.

As described above, the expansion valve in accordance with the present invention is formed with the opening portion with the inner diameter dimension of which decreases gradually from the opening side on which a power element is installed with respect to the valve body of the expansion valve is formed, and the bottomed hole is formed in a distal end part thereof.

Further, the guide member integrally having the valve element and the orifice portion are inserted under pressure or fitted in the opening portion to guide the operation rod, and the throttle portions of the high pressure side and the low pressure side for a refrigerant are defined.

By this configuration, the number of parts of expansion valve can be reduced, and the manpower for assembly can be decreased. Also, the guide member integrally having the orifice portion is inserted under pressure or fitted, and is fixed by staking, by which the guide member can be positioned, and also the leakage of refrigerant can be prevented.

Moreover, since the vibration isolating member is arranged, vibrations of valve element of the expansion valve caused by the fluctuations in pressure of a refrigerant are restrained so that the valve function can be stabilized.

Further, since the vibration isolating member has a simple construction, the fabrication thereof is easy and the vibration isolating member can be mounted to the valve body easily. Therefore, an expansion valve that is easy to handle and has high usability can be realized.

Further, since vibration isolating springs of a ring member is brought into contact with and supported on the operation rod so as to be in point contact, even if the operation rod somewhat tilts, a smooth supporting state is held.

Further, since the space (wall thickness) between a stepped hole in which the guide member is inserted under pressure and a mounting hole for mounting the expansion valve to an evaporator and the like is secured, without causing corrosion of a valve body in an expansion valve, and without any fear of leakage of refrigerant is provided in an expansion valve.

Further, the external thread portion of the mounting seat for the can body of the driving device is threadedly engaged with the internal thread portion of the driving device mounting hole of the valve body, by which the driving device is installed in the driving device mounting hole of the valve body, and the seal member is brought into close contact with the outer periphery of the mounting seat for the can body of the driving device. Therefore, the leakage of refrigerant from between the inner periphery of the driving device mounting hole of the valve body and the outer periphery of the mounting seat for the can body of the driving device can be prevented. Furthermore, by rotating the external thread portion of the mounting seat for the can body of the driving device in the tightening direction or the loosening direction with respect to the internal thread portion of the driving device mounting hole of the valve body, the operation rod can be moved vertically together with the driving device. A set value for starting the opening of the valve element can be finely adjusted by the amount of engagement of the external thread portion of the mounting seat for the can body of the driving device with the internal thread portion of the driving device mounting hole of the valve body.

BRIEF DESCRIPTION OF THE DRAWINGS

FIG. 5 are views showing another example of a guide member shown in FIG. 1, FIG. 5(A) being a front view and 5(B) being a sectional view;

FIG. 6 are views showing another example of a guide member shown in FIG. 1, FIG. 6(A) being a front view and 6(B) being a sectional view;

FIG. 16 are views of a vibration isolating member of Example 4, FIG. 16(A) being a partial explanatory view and FIG. 16(B) being a side view of a principal portion;

FIG. 18 are views of a vibration isolating member of Example 5, FIG. 18(A) being a partial explanatory view and FIG. 18(B) being a side view of a principal portion;

DETAILED DESCRIPTION OF THE PREFERRED EMBODIMENTS

Preferred examples of the present invention will now be described.

EXAMPLE 1

Figure 1:
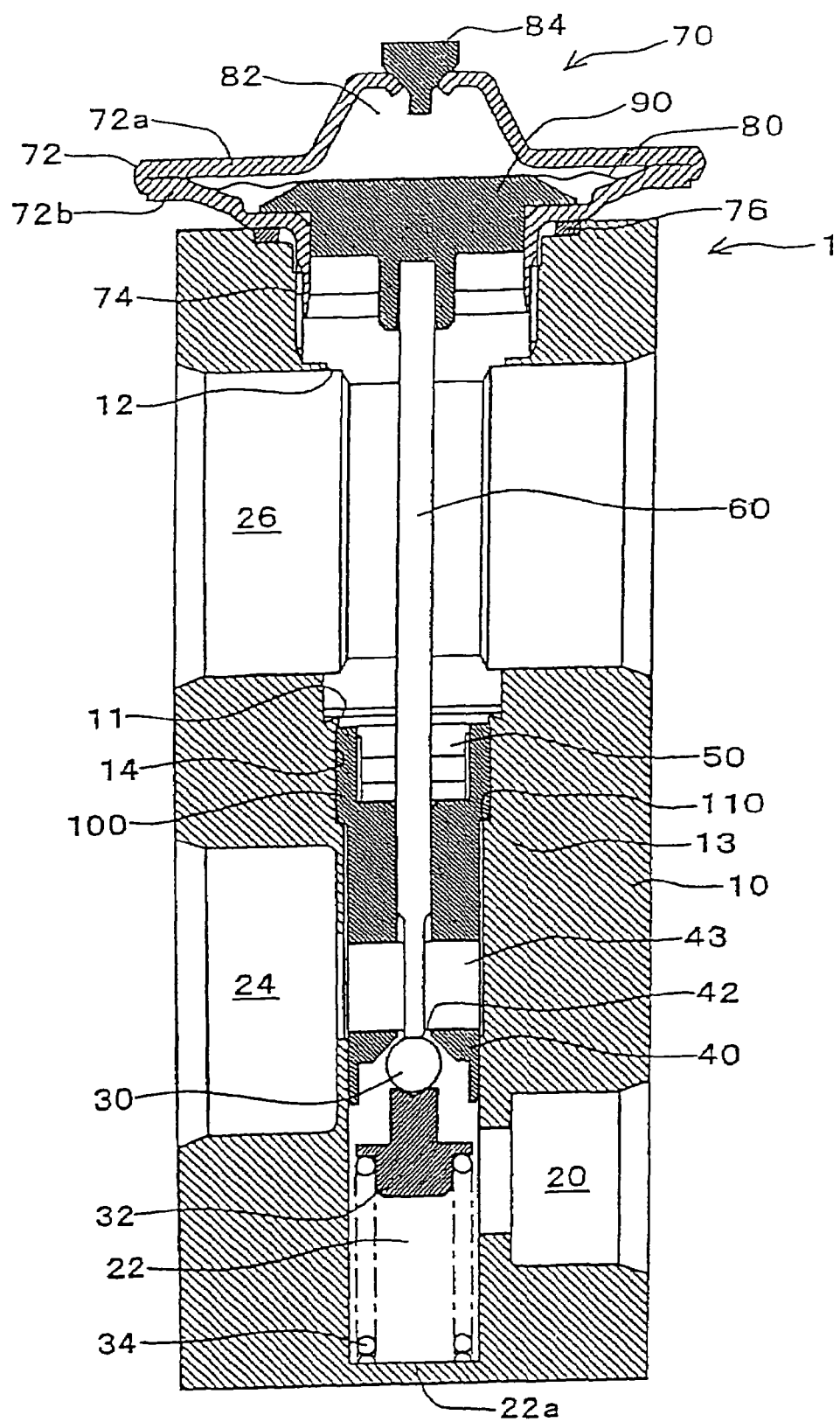
FIG. 1 is a sectional view of an expansion valve in accordance with Example 1 of the present invention.
Figure 2:
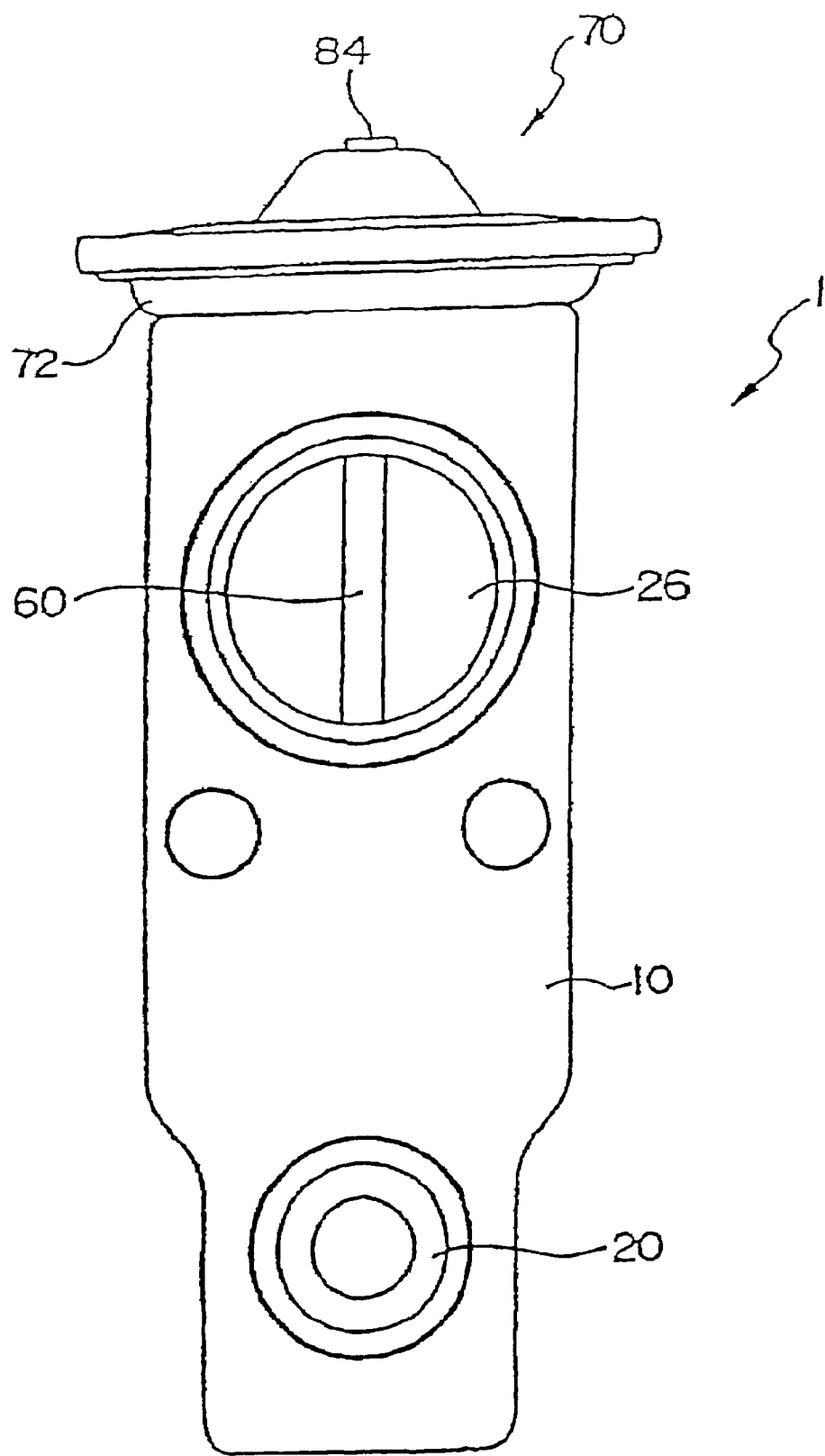
FIG. 2 is a right side view of FIG. 1.
Figure 3:
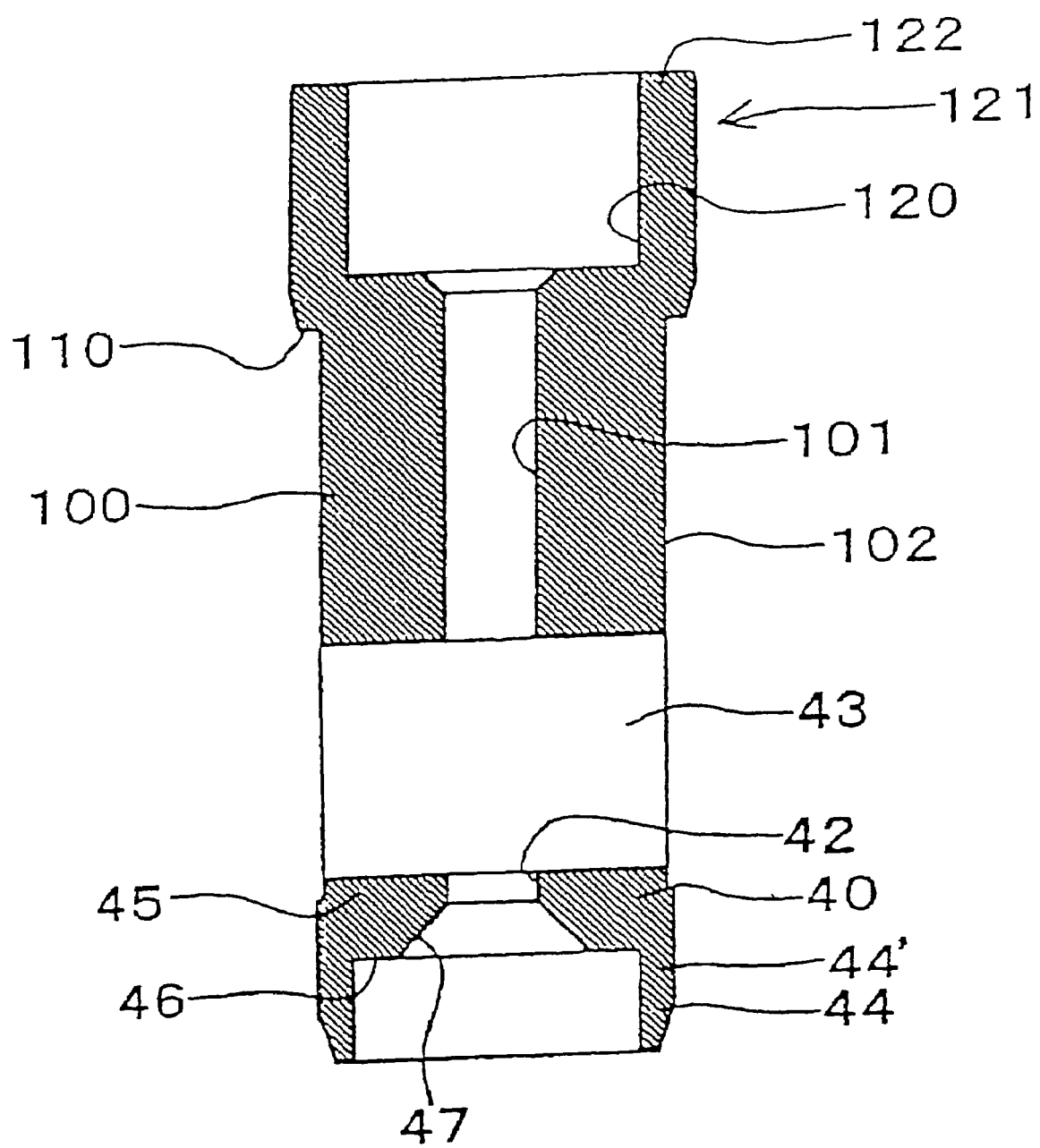
FIG. 3 is an enlarged sectional view of a guide member shown in FIG. 1.
Figure 4:
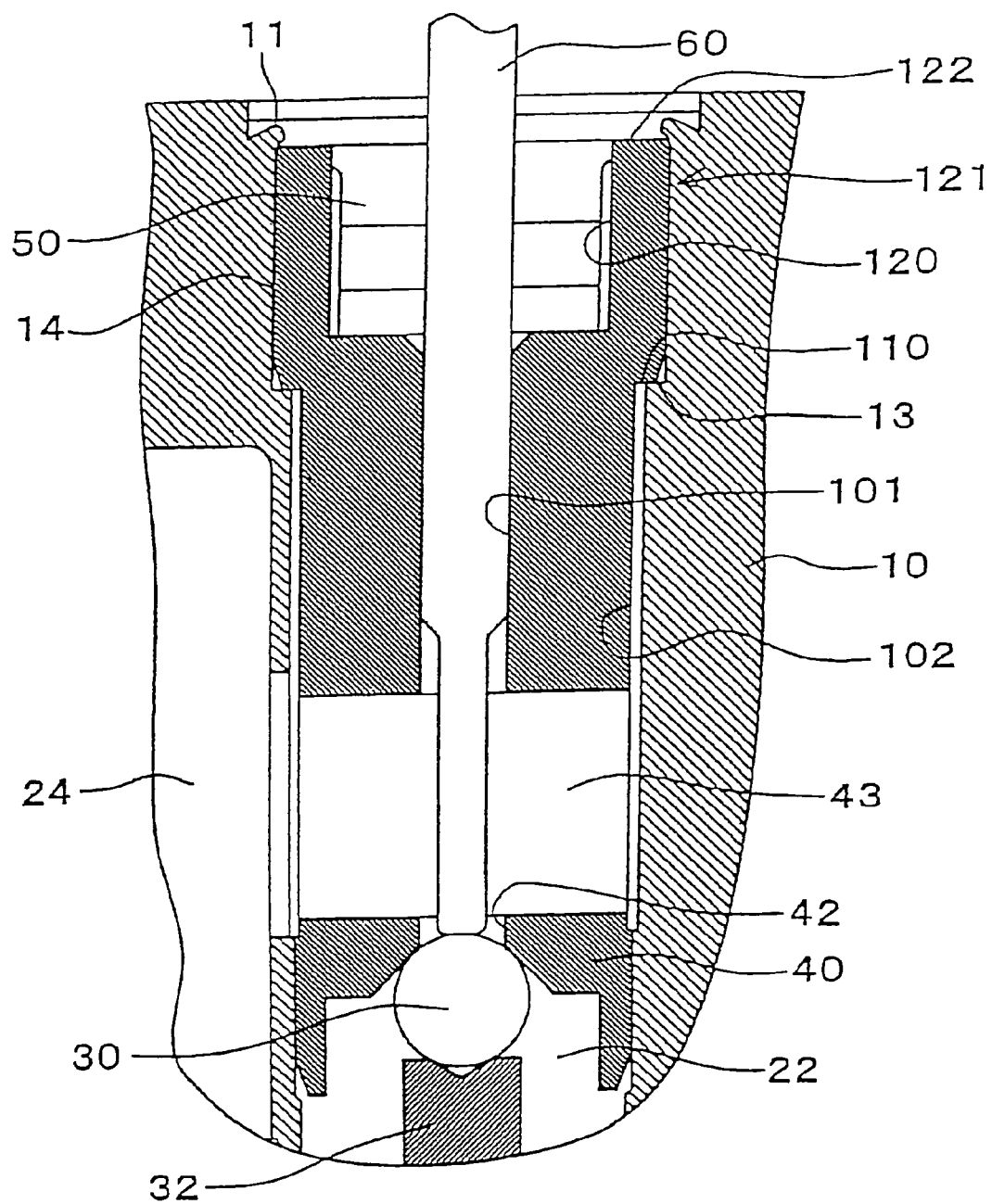
FIG. 4 is an enlarged sectional view of a principal portion of FIG. 1.

FIG. 1 is a sectional view of an expansion valve in accordance with Example 1 of the present invention, FIG. 2 is a right side view of FIG. 1, FIG. 3 is an enlarged sectional view of a guide member shown in FIG. 1, FIG. 4 is an enlarged sectional view of a principal portion of FIG. 1, FIGS. 5(A) and 5(B) are a front view and a sectional view, respectively, of another example of a guide member shown in FIG. 1, and FIGS. 6(A) and 6(B) are a front view and a sectional view, respectively, of another example of a guide member shown in FIG. 1.

An expansion valve, the whole of which is denoted by reference number 1, has a valve body 10 having a circular hole in a central part thereof, the outer surface of which is formed of an aluminum alloy and the like and is of a prismatic shape, and the valve body 10 is provided with a first passage 20 through which a high-pressure refrigerant flows.

The first passage 20 communicates with a valve chamber 22 having a bottom 22a, and an orifice portion 40 formed integrally with a guide member 100 is fixed under pressure in an opening portion of the valve chamber 22.

Further, spherical valve element 30, which is installed by welding to a support member 32, is arranged in the valve chamber 22. The support member 32 always urges the valve element 30 toward the orifice portion 40 by means of a spring 34.

As shown in FIG. 3, the cylindrical guide member 100 provided in the valve body 10 includes a guide portion 102 formed with an operation rod hole 101 in the axis portion thereof, a cylindrical large-diameter portion 121 having a step portion on its peripheral portion and formed integrally with the guide portion 102 via a step portion 110, and the orifice portion 40 integrally formed via a passage 43 of the guide portion 102 with respect to the valve body 10. As shown in FIGS. 1 and 4, a step portion 13 formed on the valve body 10 is in surface contact with the step portion 110 of the guide member 100, and thereby the guide member 100 is fixed by being positioned exactly, so that the sealing is secured by the surface contact of the step portion 110 with the step portion 13.

The passage of refrigerant between a second passage 24 and a third passage 26 may be sealed by inserting a ring-shaped seal member (not shown) in an inner-diameter part of the guide member 100.

Further, as shown in FIGS. 1 and 4, the orifice portion 40 communicating with the second passage 24, which is formed via the passage 43 formed at the lower part of the guide member 100, has a throttle portion 42, which causes the valve chamber 22 to communicate with the passage 43, in a central part thereof, so that a flow path for the refrigerant is formed between the orifice portion 40 and the valve element 30.

The refrigerant having passed through the orifice portion 40 is sent out to the evaporator (not shown) side through the passage 43 and the second passage 24.

The refrigerant returning from the evaporator is sent to the compressor (not shown) side through the third passage 26.

As shown in FIGS. 3 and 4, in an upper part of the guide portion 102, the large-diameter portion 121 arranged in a stepped hole 14 is formed, and a vibration isolating member 50 is arranged in a large-diameter hole portion 120 and mounted on an operation rod 60, by which the operation rod 60 is prevented from vibrating.

Further, the columnar guide portion 102 is formed continuously with the large-diameter portion 121, and the operation rod 60 is slidably guided in a central part thereof. In a peripheral part at the lower end of the orifice portion 40, a guide portion 44 having the outer periphery of which has a small diameter at the lower end is formed.

The guide portion 102 of the guide member 100 having the above-described construction is fixed by staking to the valve body 10.

Specifically, an end part 122 of the large-diameter portion, which is an upper end part of the guide member 100, is fixed by staking to the valve body 10 by using a staking part 11 (refer to FIG. 4) formed on the valve body 10 side.

Therefore, the guide member 100 of this example is fixed by staking to the valve body 10, and also the orifice portion 40 of the guide member 100 is fixed under pressure to the valve body 10, so that the guide member 100 is fixed to the valve body 10 reliably.

In addition, the orifice portion 40 is fixed by ensured sealing because it is pressed in.

Furthermore, since the guide member 100 is brought into surface contact with the valve body 10 by the step portion 110, the step portion 110 acts as a positioning portion at the time when the guide member 100 is fixed, and also can surely provide the sealing by means of the surface contact.

Accordingly, the leakage of refrigerant from the second passage 24 to the third passage 26 can be prevented.

Thus, the leakage of refrigerant from the first passage 20 to the second passage 24 and the leakage of refrigerant from the second passage 24 to the third passage 26 can be prevented.

The guide portion 44 having a small diameter in the orifice portion 40 is formed by a wall portion 44' formed by being erected integrally with a circular edge part of a disc portion 45, and a flat portion 46 continuous with the wall portion 44' and a tilt portion 47 are connected to the throttle portion 42.

The valve element 30 is provided so as to be arranged in the tilt portion 47 and be opposed to the throttle portion 42.

As shown in FIG. 5, as another example, an orifice portion 40' in a lower part of the guide member 100 may have a shape such that the guide portion (refer to FIG. 3) is not formed and the vertical length is short to simplify the fabrication of the guide member 100.

Further, as another example, as shown in FIGS. 6(A) and 6(B), an orifice member 40" may be made as a member separate from the guide member 100 to improve the handling ability.

If the orifice member 40" is made as a member separate from the guide member 100, in mounting the guide member 100 in the valve body 10, the guide member 100 is mounted after the orifice member 40"is first mounted through an opening 12.

As shown in FIG. 1, in an end part on the side opposite to the valve chamber 22 of the valve body 10, a driving device 70 for the valve element 30, which is called a power element, is installed.

The power element 70 has a can body 72 in which an upper lid 72a and a lower lid 72b are welded integrally, and a diaphragm 80 is held between the upper lid 72a and the lower lid 72b.

The can body 72 is fixed to the valve body 10 by a threaded portion 74, and is sealed by a seal member 76.

Between the diaphragm 80 and the upper lid 72a, a pressure chamber 82 is formed, which is filled with a working fluid and is sealed by a plug 84.

On the side opposite to the pressure chamber 82 of the diaphragm 80, a stopper member 90 is disposed.

The refrigerant in the third passage 26 is introduced to the back surface of the stopper member 90 through the opening 12.

The stopper member 90 slides in response to the displacement of the diaphragm 80.

The stopper member 90 holds the operation rod 60, and the distal end of the operation rod 60 abuts on the valve element 30.

The displacement of the diaphragm 80 drives the valve element 30 via the operation rod 60 to control a flow path area between the valve element 30 and the orifice portion 40.

In the above explanation of examples, the case where the orifice portion 40 of the guide member 100 is fixed under pressure and the guide member 100 is fixed by staking has been described. However, it is a matter of course that the present invention is not limited to these examples, and an orifice portion 240 of a guide member 200 may be brought into contact with the valve body 10 to ensure the sealing.

Figure 7:
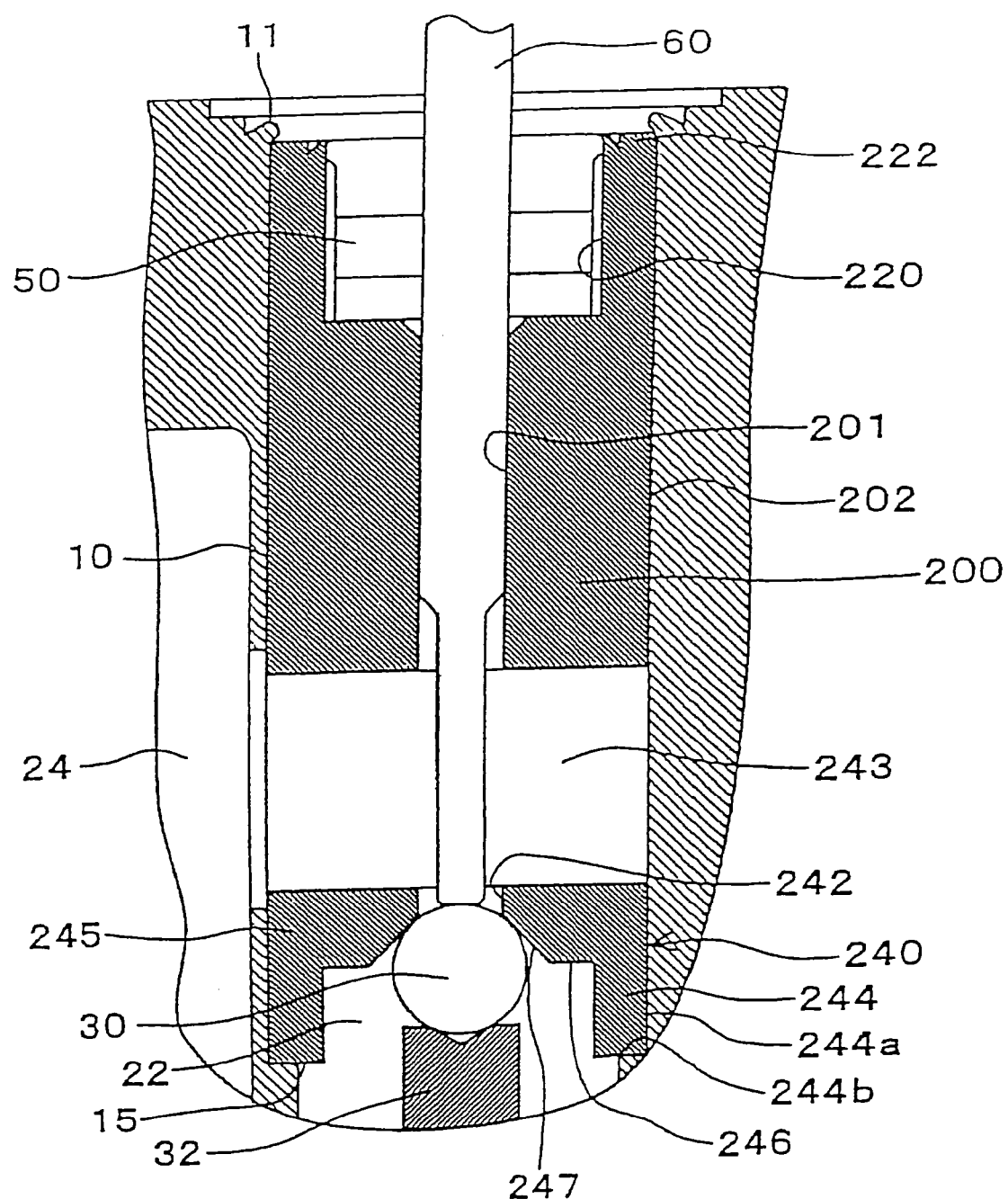
FIG. 7 is a sectional view of a principal portion of another example of the present invention.

FIG. 7 is a sectional view of the guide member 200, which is a principal portion of another example in which the orifice portion is in contact with the valve body.

In FIG. 7, the valve body 10 is formed with a step portion 15, and the orifice portion 240 of the guide member 200 is in surface contact with the step portion 15, by which the sealing is ensured.

Specifically, the orifice portion 240 formed integrally with the guide member 200 is formed by a disc portion 245 formed with a throttle portion 242 in the center thereof and a wall portion 244 formed integrally with the disc portion 245 by being erected downward from the peripheral edge of the disc portion 245. The wall portion 244 is arranged in an opening part of the valve chamber 22 of the valve body 10 with a predetermined clearance being provided, and an end part 244b of the wall portion 244 is in surface contact with the step portion 15 to constitute a positioning portion.

Furthermore, a guide portion 202 which is formed integrally with the orifice portion 240 to constitute the guide member 200 is fixed by staking by using the staking part 11 provided on the valve body 10.

Stake fixing is performed by staking an end part 222 of the guide portion 202 by using the staking part 11.

Thus, the guide member 200 is positioned by the positioning portion 244b and is fixed to the valve body 10.

By the above-described construction, the sealing is ensured by the positioning portion 244b. Therefore, even if the high-pressure refrigerant introduced into the first passage 20 leaks to the second passage 24 side, the leakage is prevented by the positioning portion 244b.

Further, in the orifice portion 240, the wall portion 244 and the throttle portion 242 of the disc portion 245 are connected to each other by a flat portion 246 and a tilt portion 247, and the valve element 30 is arranged in the tilt portion 247 so as to be opposed to the throttle portion 242.

Furthermore, it is a matter of course that the aforementioned leakage can be prevented by fixing by staking the guide portion 202 to the valve body 10 by using the staking part 11 of the valve body 10.

Therefore, according to this example, the leakage of refrigerant from the first passage 20 to the second passage 24 and the leakage of refrigerant from the second passage 24 to the third passage 26 can be prevented.

In a large-diameter hole portion 220 of the guide portion 202, as in the example shown in FIG. 3, the vibration isolating member 50 is arranged, and is mounted on the operation rod 60, by which the operation rod 60 is prevented from vibrating.

Figure 8:
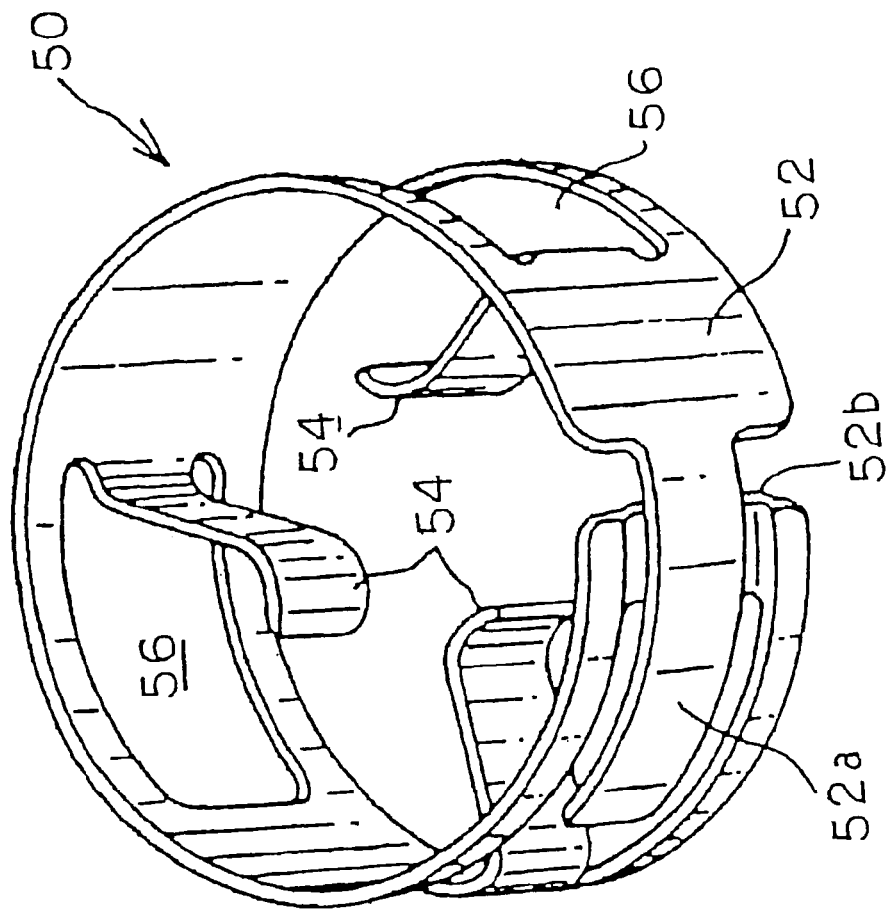
FIG. 8 is a perspective view of a vibration isolating member shown in FIG. 1.

FIG. 8 is a perspective view showing a construction of the vibration isolating member 50.

The vibration isolating member 50 has a ring portion 52 formed by curving a metal sheet with high elasticity into a circular shape and vibration isolating springs 54 each formed by notching the ring portion 52 and bending the notched portion to the inner side.

The ring portion 52 is constructed so that both end parts 52a and 52b are lapped on each other. The vibration isolating member 50 is inserted into an inner-diameter part of the large-diameter hole portion 120 in the guide member 100 in a state in which the diameter of the ring portion 52 is decreased, by which the vibration isolating member 50 can be positioned on the inner side of the guide member 100 by utilizing a elastic force restoring the diameter.

The vibration isolating springs 54 are in contact with the outer periphery of the rod-shaped operation rod 60, and thereby restrains the vibrations of the valve element 30.

Although three vibration isolating springs 54 are provided in this example, four vibration isolating springs can be provided.

Next, the procedure for assembling this expansion valve will be explained.

First, the support member 32 to which the spring 34 and the valve element 30 have been welded is inserted into the bottomed valve chamber 22 through the opening 12 on the side on which the power element 70 of the valve body 10 is installed.

Next, the guide member 100 to which the vibration isolating member 50 has been installed and in which the operation rod 60 has been inserted is inserted under pressure into the stepped hole 14 in the valve body 10 through the opening 12.

The guide member 100 is positioned in the axial direction by the step portion 110, and is fixed by staking (using the staking part 11).

Finally, an assembly of the power element 70 is threadedly engaged with the valve body 10 by the threaded portion 74, by which the assembly of the expansion valve 1 is completed.

EXAMPLE 2

Next, Example 2 will be explained with reference to FIGS. 9 to 11.

Figure 9:
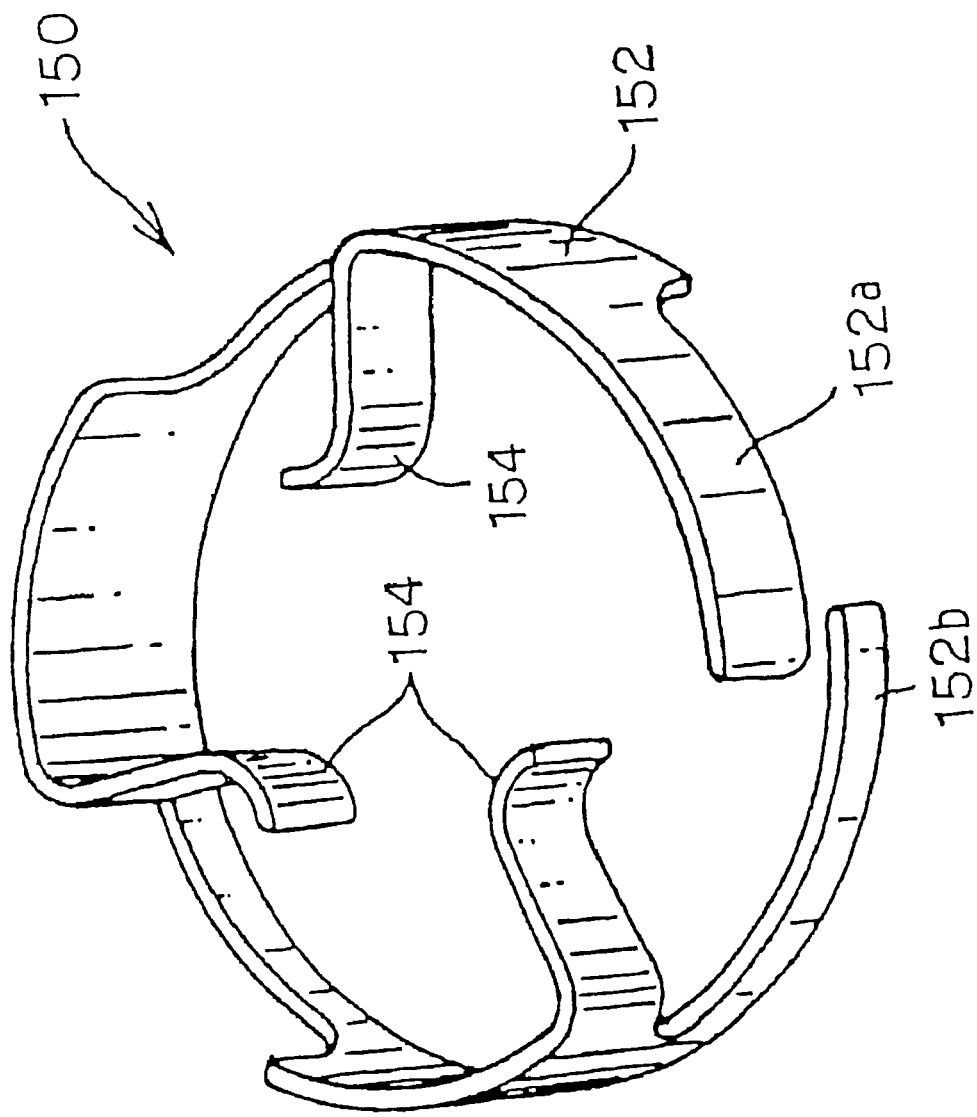
FIG. 9 is a perspective view of a vibration isolating member of Example 2.
Figure 10:
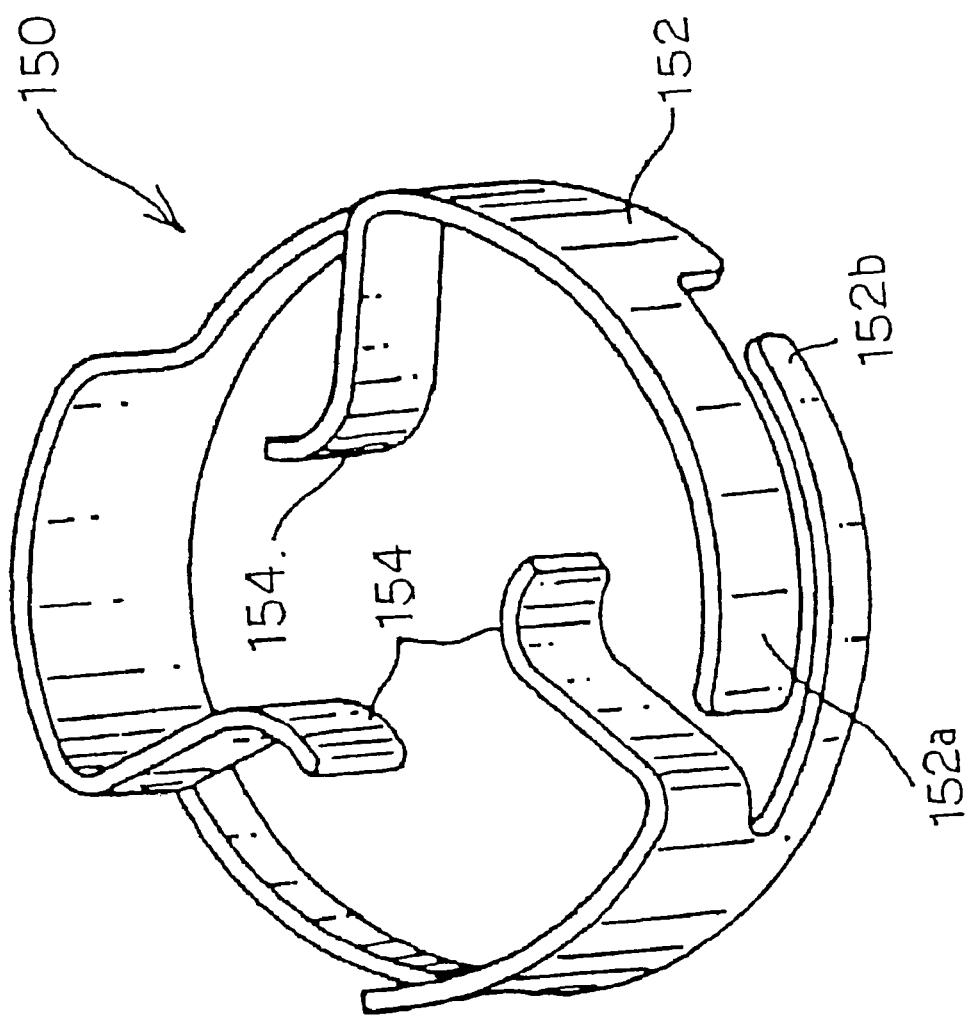
FIG. 10 is a perspective view showing a state in which the vibration isolating member shown in FIG. 9 is mounted in a guide member.
Figure 11:
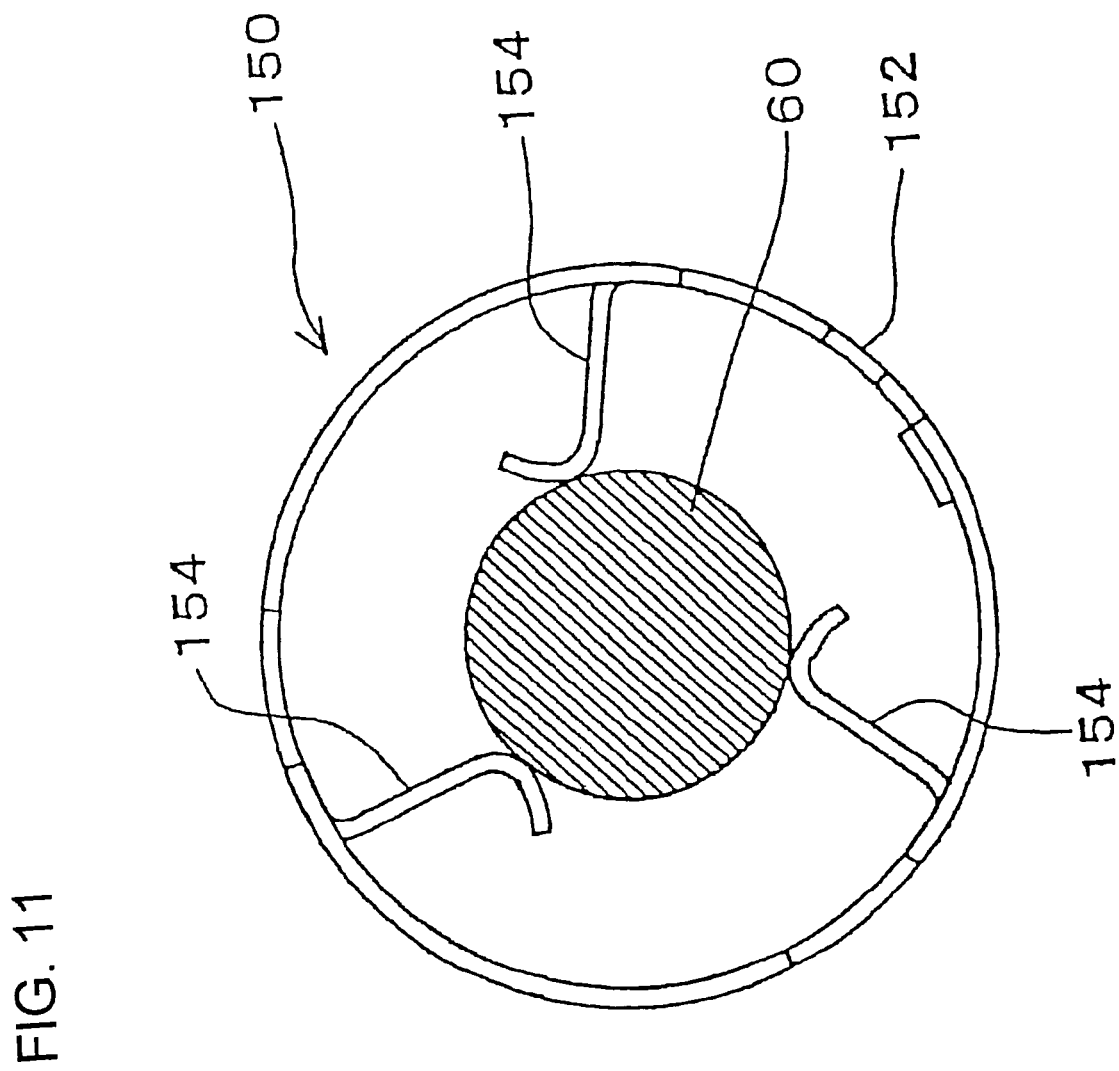
FIG. 11 is a plan view showing a state in which an operation rod is mounted in the vibration isolating member shown in FIG. 9.

FIG. 9 is a perspective view of a vibration isolating member of Example 2, FIG. 10 is a perspective view showing a state in which the vibration isolating member shown in FIG. 9 is mounted in a guide member, and FIG. 11 is a plan view showing a state in which an operation rod is mounted in the vibration isolating member shown in FIG. 9.

As shown in FIG. 11, the vibration isolating member (ring member 150) shown in FIGS. 9 and 10 is used to support the operation rod 60.

As shown in FIG. 9, the vibration isolating member of Example 2 is formed by the ring member 150 including one annularly-shaped ring portion 152 and three plate-shaped vibration isolating springs 154 arranged on one side of the ring portion 152.

Also, for this ring member 150, as in Example 1, a cross part is formed in an end part of a plate body forming the ring portion 152, and as this cross part, narrow tongue elements 152a and 152b with the same curvature as that of the ring portion 152 are extended from both end parts of the ring portion 152.

The shape, material, and number of the vibration isolating springs 154 are the same as those in the case of Example 1.

According to the ring member 150 constructed as described above, in the state in which the ring member 150 is mounted in the guide member 100, as shown in FIG. 11, the periphery of the operating rod 60 is supported by the vibration isolating springs 154 at three places, and the ring member 152 acts as a vibration isolating member for the valve element 30.

Therefore, even if fluctuations in refrigerant pressure occur in a refrigerating cycle, the motion of the valve element 30 can be stabilized, so that the flow rate of refrigerant can be controlled exactly, and the noise generated by the vibrations of the operation rod 60 can be prevented.

In the above-described example, the vibration isolating spring 154 is formed so as to have the same width through the whole length. However, needless to say, the vibration isolating spring 154 may have other shapes, for example, it may be formed so as to have a triangular shape with a tip end part thereof being a vertex to adjust the degree of elasticity.

EXAMPLE 3

Next, Example 3 will be explained with reference to FIGS. 12 to 15.

Figure 12:
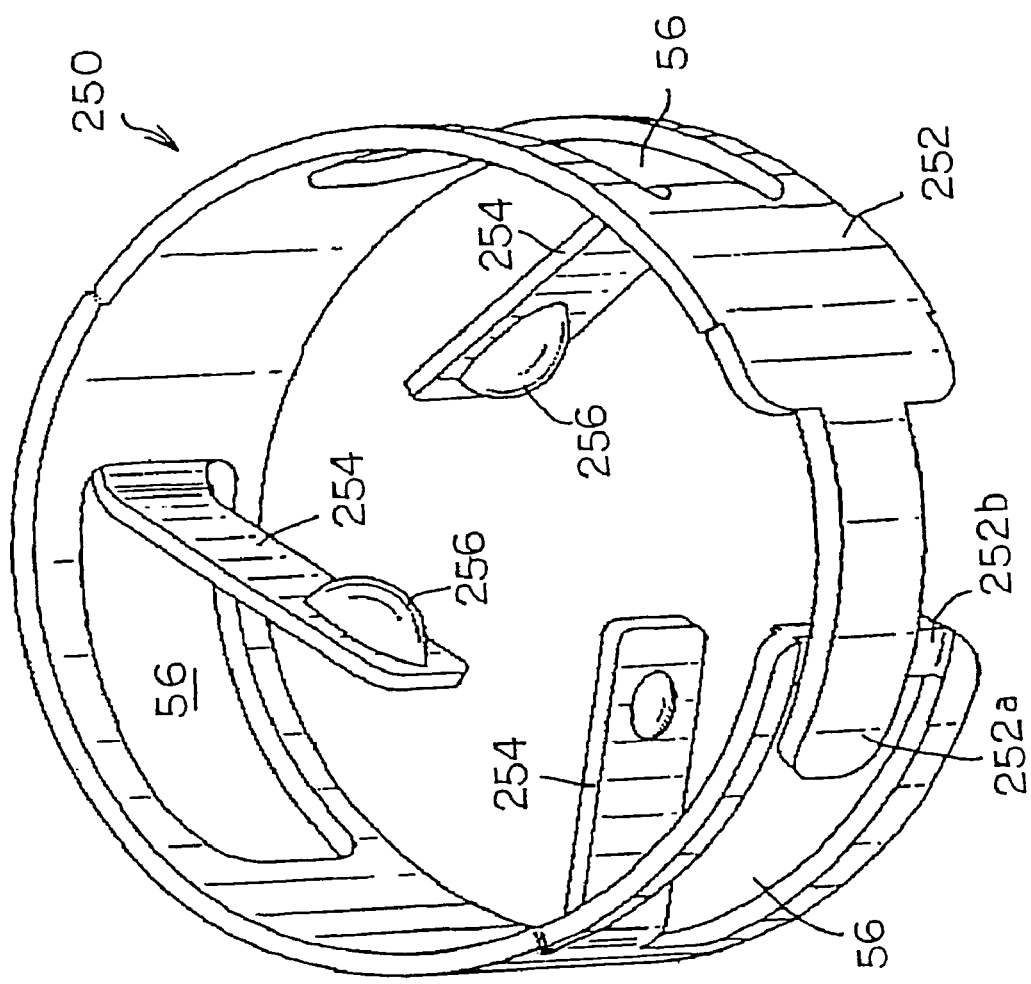
FIG. 12 is a perspective view of a vibration isolating member of Example 3.
Figure 13:
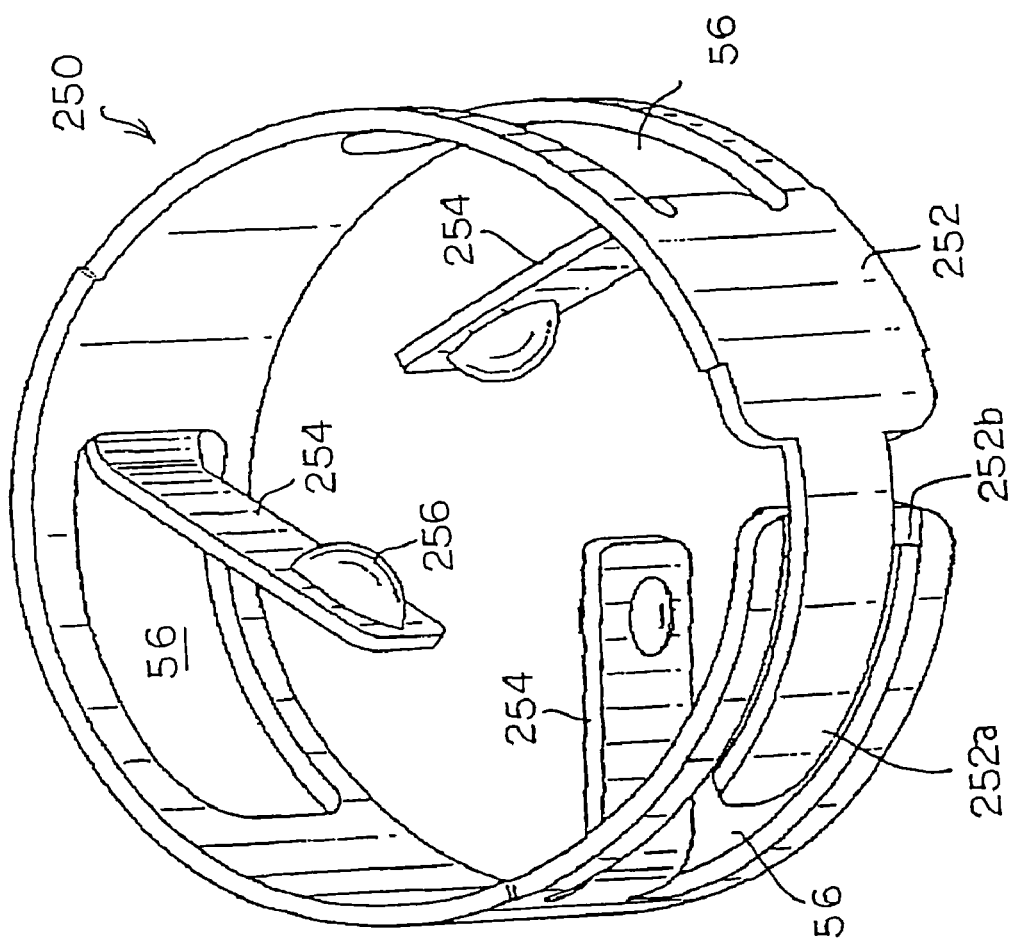
FIG. 13 is a perspective view showing a state in which the vibration isolating member shown in FIG. 11 is mounted in a guide member.
Figure 14B:
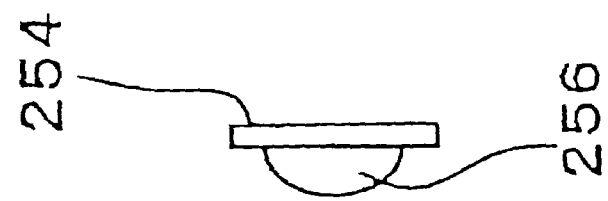
FIG. 14 are views of the vibration isolating member shown in FIG. 12, FIG. 14(A) being a partial explanatory view and FIG. 14(B) being a side view of a principal portion.
Figure 14A:
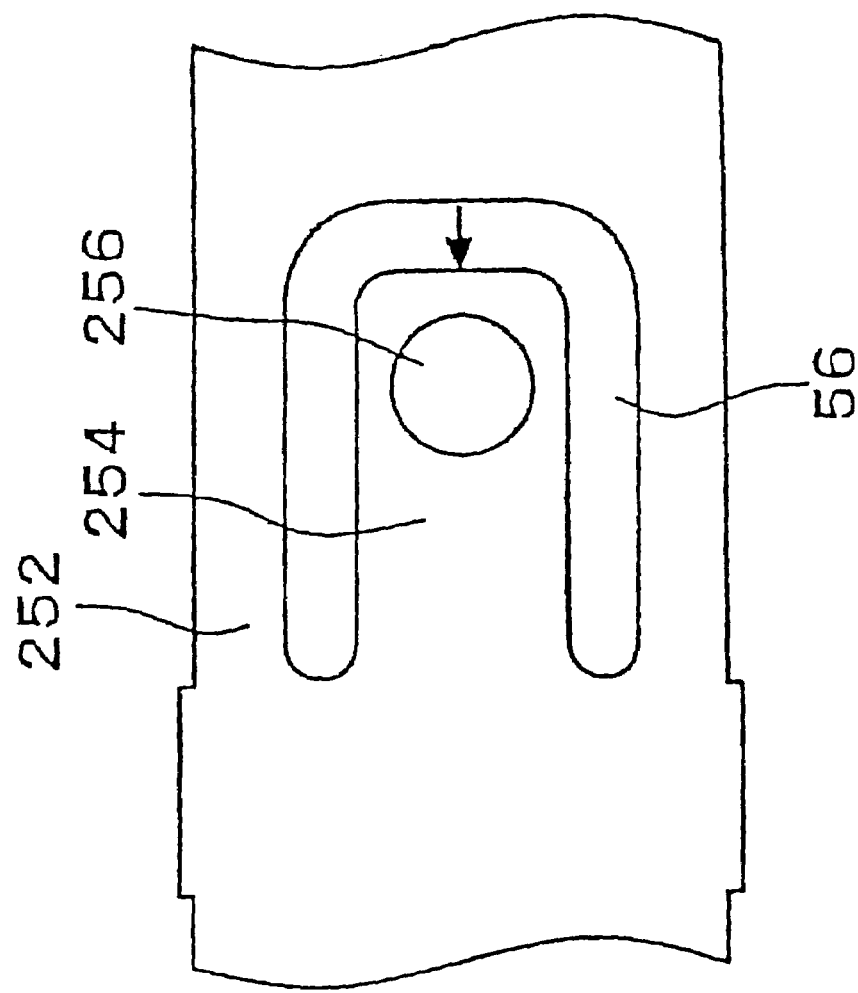
Figure 15:
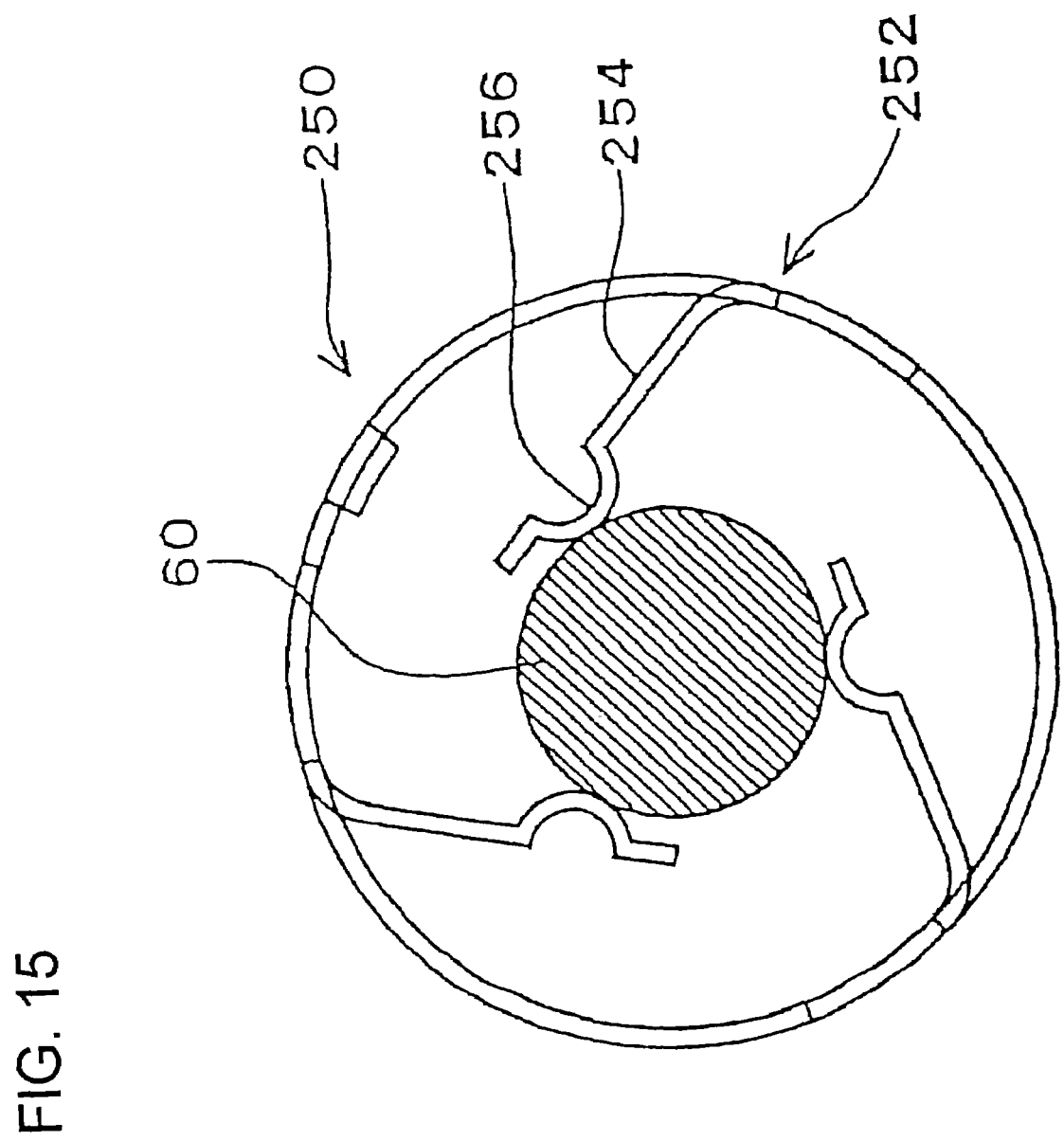
FIG. 15 is a plan view showing a state in which an operation rod is mounted in the vibration isolating member shown in FIG. 12.

FIG. 12 is a perspective view of a vibration isolating member of Example 3, FIG. 13 is a perspective view showing a state in which the vibration isolating member shown in FIG. 12 is mounted in a guide member, FIGS. 14(A) and 14(B) area partial explanatory view and a side view of a principal portion, respectively, of a vibration isolating member shown in FIG. 12, and FIG. 15 is a plan view showing a state in which an operation rod is mounted in the vibration isolating member shown in FIG. 12.

In Example 3, the vibration isolating member (ring member 250) shown in FIGS. 12 to 14 is used to support the operation rod 60 as in Examples 1 and 2.

As in Examples 1 and 2, the operation rod 60 is driven by the power element 70 as shown in FIG. 1.

Also, the ring member 250 is fitted in the large-diameter portion 120 formed in the guide member 100 shown in FIG. 5 as in Examples 1 and 2.

A ring portion 252 of the ring member 250 is mounted so as to be in elastic contact with the inner side wall of the large-diameter portion 120.

For the ring member 250 of Example 3, as shown in FIGS. 12 to 15, a semispherical spherical surface portion 256 is formed in a tip end part of each of three flat-plate shaped vibration isolating springs 254 formed on the inner surface of the ring portion 252, and the spherical surface portions 256 support the operation rod 60 so as to be in point contact with the side surface of the operation rod 60.

Also, as shown in FIGS. 12 to 14, the ring portion 252 is formed with notches 56 along the lengthwise direction thereof.

The ring portion 252 is constructed so that both end parts 252a and 252b are lapped on each other. The vibration isolating member 250 is inserted into the inner-diameter part of the large-diameter hole portion 120 in the guide member 100 in a state in which the diameter of the ring portion 252 is decreased, by which the vibration isolating member 250 can be positioned on the inner side of the guide member 100 by utilizing a elastic force for restoring the diameter.

Therefore, according to Example 3, the periphery of the operation rod 60 is supported by the three vibration isolating springs 254 at three places so that the semispherical spherical surface portion 256 formed in the tip end part of each of the three flat-plate shaped vibration isolating springs 254 is in point contact with the side surface of the operation rod 60. Therefore, the ring member 250 acts as a vibration isolation for the operation rod 60. Even if fluctuations in refrigerant pressure occur in a refrigerating cycle, the motion of the valve element 30 can be stabilized, so that the flow rate of refrigerant can be controlled exactly, and the noise generated by the vibrations of the valve element 30 can be prevented.

Further, according to Example 3, since the ring member 250 is arranged in a portion of the operation rod 60 separate from the flow path of refrigerant as in Examples 1 and 2, the ring member 250 does not impart flow resistance to the refrigerant. Further, there is no fear that the ring member 250 itself generates vibrations or noise caused by the flow of refrigerant.

Furthermore, as shown in FIG. 15, since the vibration isolating spring 254 of the ring member 250 is in point contact with the operation rod 60, even if the operation rod 60 somewhat tilts, a smooth supporting state is held.

EXAMPLE 4

Next, Example 4 will be explained with reference to FIGS. 16 and 17.

Figure 17:
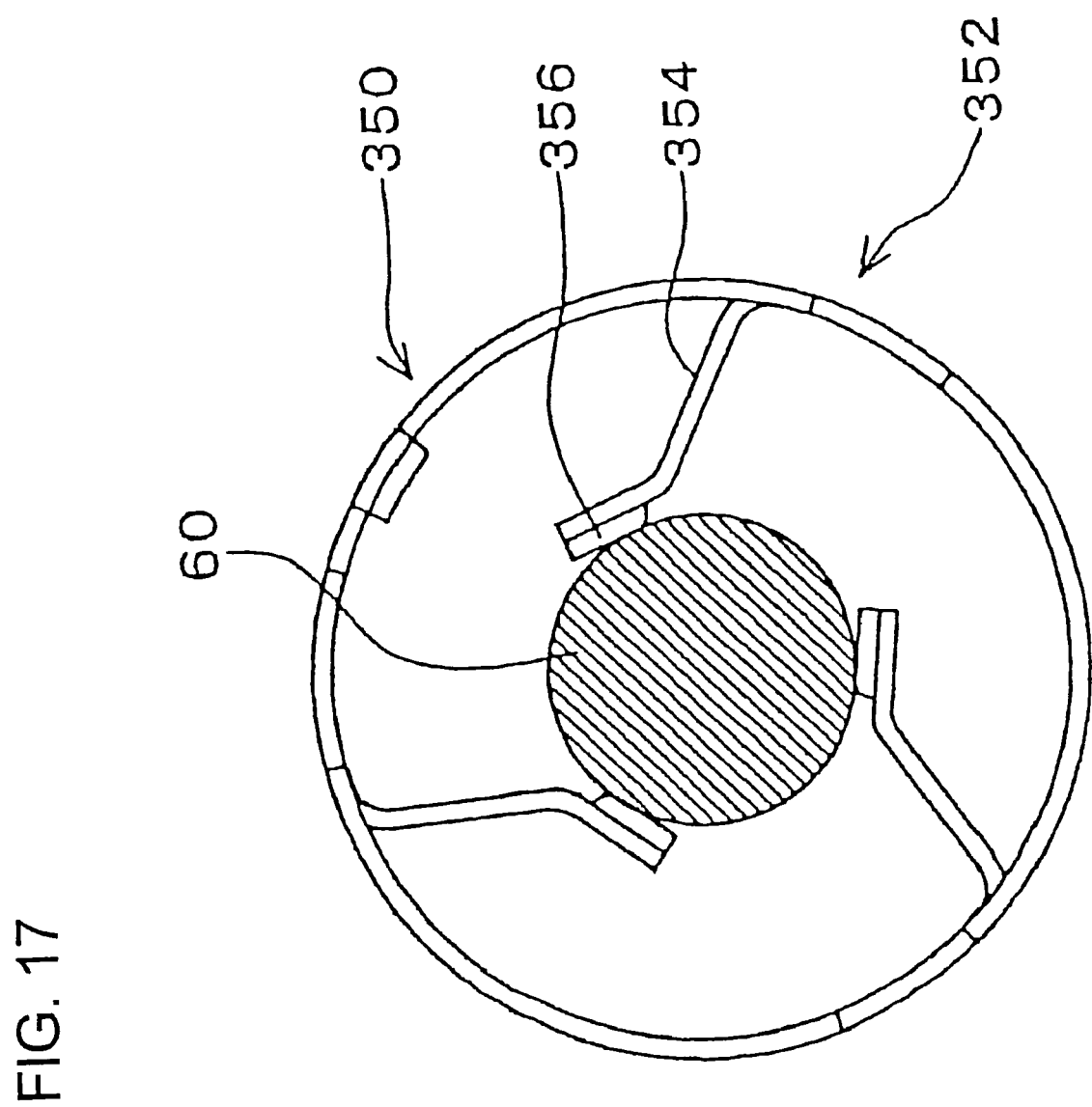
FIG. 17 is a plan view showing a state in which an operation rod is mounted in the vibration isolating member shown in FIG. 16.

FIGS. 16(A) and 16(B) are a partial explanatory view and a side view of a principal portion, respectively, of a ring member of Example 4, and FIG. 17 is a plan view showing a state in which an operation rod is mounted in the ring member shown in FIG. 16.

FIG. 16(B) is a view taken in the direction of the arrow of FIG. 16(A).

Example 4 is a modification of Example 3. As in Examples 1 to 3, a vibration isolating member (ring member 350) shown in FIGS. 16 and 17 is fitted in the large-diameter portion 120 formed in the guide member 100 shown in FIG. 15.

For the ring member 350, three vibration isolating springs 354 integral with a ring portion 352 are formed on the inner side of the ring portion 352, and a tip end part of each of the springs 354 is bent into a chevron shape in the same direction. Also, a curved protrusion 356 of a cylindrical peripheral surface shape is formed in the tip end part, so that the curved protrusions 356 support the operation rod 60 so as to be in point contact with the peripheral surface of the operation rod 60.

According to the above-described construction, the ring member 350 acts as a vibration isolating member for the valve element 30 via the operation rod 60. Therefore, even if fluctuations in refrigerant pressure occur in a refrigerating cycle, the motion of the valve element 30 can be stabilized, so that the flow rate of refrigerant can be controlled exactly, and the noise generated by the vibrations of the valve element 30 can be prevented.

Further, according to Example 4, since the ring member 350 is arranged in a portion of the operation rod 60 separate from the flow path of refrigerant as in other examples, the ring member 350 does not impart flow resistance to the refrigerant. Further, there is no fear that the ring member 350 itself generates vibrations or noise caused by the flow of refrigerant.

Furthermore, since the vibration isolating spring 354 of the ring member 350 is in point contact with the operation rod 60, even if the operation rod 60 somewhat tilts, or even if the vibration isolating spring 354 is elastically deformed, a smooth supporting state is held.

EXAMPLE 5

Next, Example 5 will be explained with reference to FIGS. 18 and 19.

Figure 19:
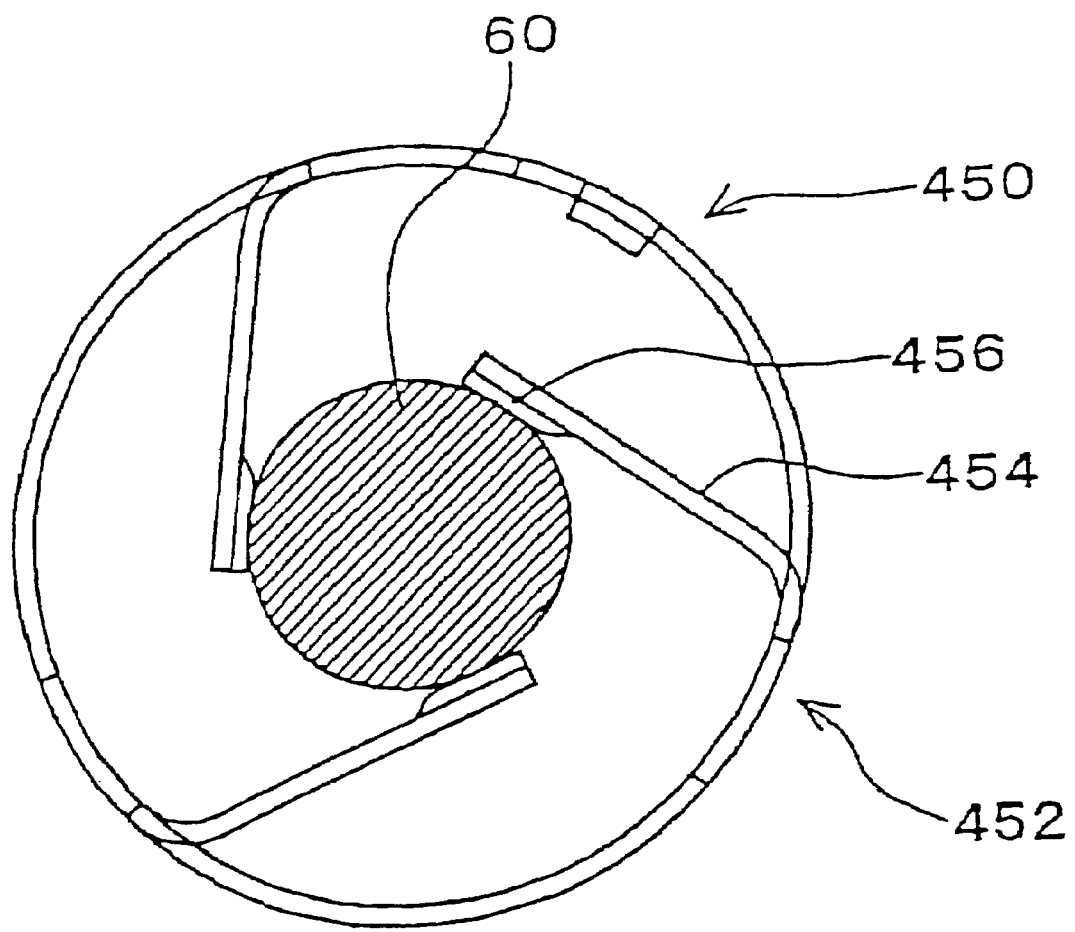
FIG. 19 is a plan view showing a state in which an operation rod is mounted in the vibration isolating member shown in FIG. 18.

FIGS. 18(A) and 18(B) are a partial explanatory view and a side view of a principal portion, respectively, of a ring member of Example 5, and FIG. 19 is a plan view showing a state in which an operation rod is mounted in the ring member shown in FIG. 18.

FIG. 18(B) is a view taken in the direction of the arrow of FIG. 18(A).

Example 5 is a modification of Example 4. In Example 5, a vibration isolating member (ring member 450) is used to support the operation rod 60 as in Example 4.

As in other examples, the ring member 450 is fitted in the large-diameter portion 120 of the guide member 100.

For the ring member 450, as shown in FIGS. 18(A) and 18(B) and FIG. 19, three vibration isolating springs 454 integral with a ring member 452 are formed on the inner side of the ring member 452, and a tip end part of each of the springs 454 is bent in the same direction. Also, a protrusion 456 is formed in the tip end part, so that the protrusions 456 support the operation rod 60 so as to be in point contact with the peripheral surface of the operation rod 60.

According to the above-described construction, the ring member 450 acts as a vibration isolating member for the valve element 30 via the operation rod 60. Therefore, even if fluctuations in refrigerant pressure occur in a refrigerating cycle, the motion of the valve element 30 can be stabilized, so that the flow rate of refrigerant can be controlled exactly, and the noise generated by the vibrations of the valve element 30 can be prevented.

Further, according to Example 5, the same effects as those of the other examples can be anticipated.

EXAMPLE 6

In the case where Example 1 shown in FIG. 1 is adopted, since the stepped hole 14 having a large diameter, which is formed in the valve body 10, and mounting holes 10a and 10b (refer to FIG. 21) for mounting the expansion valve to an evaporator and the like are arranged close to each other, there arises a problem in that a wall thickness between these holes cannot be secured.

Accordingly, a technique described in Example 6 has been invented as a solution to the above-described problem.

Hereunder, Example 6 will be explained with reference to FIGS. 20 and 21.

Figure 20:
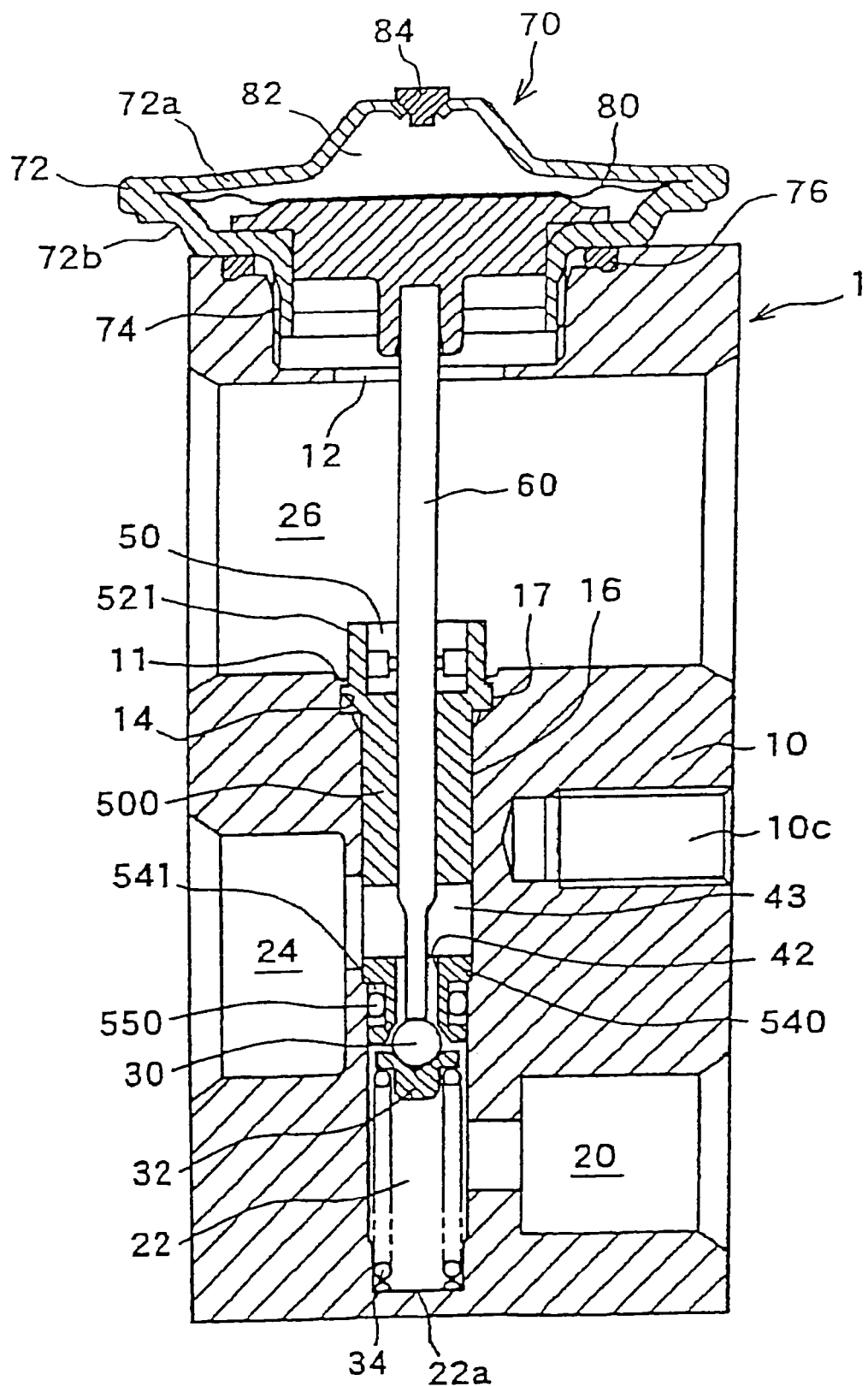
FIG. 20 is a sectional view of an expansion valve of Example 6 of the present invention (sectional view taken along the line X-X line of FIG. 21)
Figure 21:
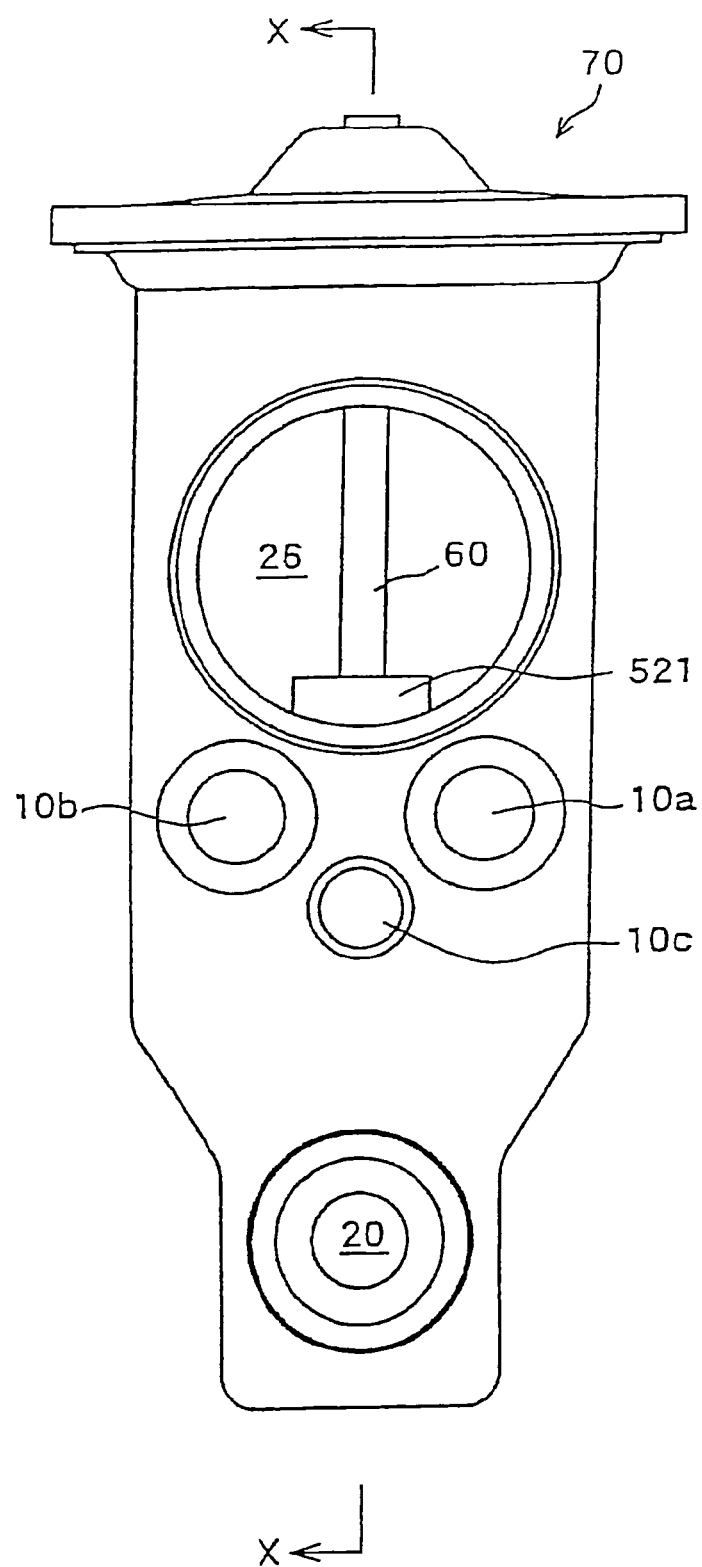
FIG. 21 is a right side view of FIG. 20.

FIG. 20 is a sectional view of an expansion valve of Example 6 of the present invention (sectional view taken along the line X-X of FIG. 21), and FIG. 21 is a right side view of FIG. 20.

In FIGS. 20 and 21, the same reference numbers as those in FIGS. 1 to 4 are applied to the same elements as those in Example 1, and the explanation thereof is omitted.

Example 6 is characterized in that the ring-shaped vibration isolating member 50 is installed in the third passage 26 as shown in FIG. 20.

Specifically, in the case of Example 6, as shown in FIGS. 20 and 21, the valve body 10 is formed with a small-diameter hole portion 16 and a large-diameter hole portion 17 (corresponding to the stepped hole 14 in Example 1), in which a guide member 500 is inserted, and is formed so that the vertical length (height) of the small-diameter hole portion 16 is long and the vertical length (height) of the large-diameter hole portion 17 is short as compared with Example 1 (especially, refer to FIG. 4).

The guide member 500 is formed so that a uniform-diameter portion constituting a lower part thereof is long as compared with Example 1, and hence is formed so that most of an increased-diameter portion 521 is located in the third passage 26 when the guide member 500 is fitted in the small-diameter hole portion 16 and the large-diameter hole portion 17.

The vibration isolating member 50 is arranged in this increased-diameter portion 521 as in other examples.

By this construction, the large-diameter hole portion 17 can be provided at a position separate from the mounting holes 10a and 10b, so that the space (wall thickness) between the large-diameter hole portion 17 and the mounting holes 10a and 10b in the valve body 10 can be secured while the function of the vibration isolating member 50 is kept.

Therefore, also in Example 6, the same vibration isolating effect as that of Example 1 is achieved, preventing the corrosion of the valve body 10, so that a fear of refrigerant leakage can be dispelled.

Also, as shown in FIG. 20, an annular seal groove 541 is formed at the outer periphery of an orifice portion 540 at a lower part of the guide member 500, and a ring seal 550 is fitted in the seal groove 541, by which the sealing between the valve chamber 22 and the second passage 24 can be improved.

EXAMPLE 7

Next, Example 7 will be explained with reference to FIGS. 22 and 23.

Figure 22:
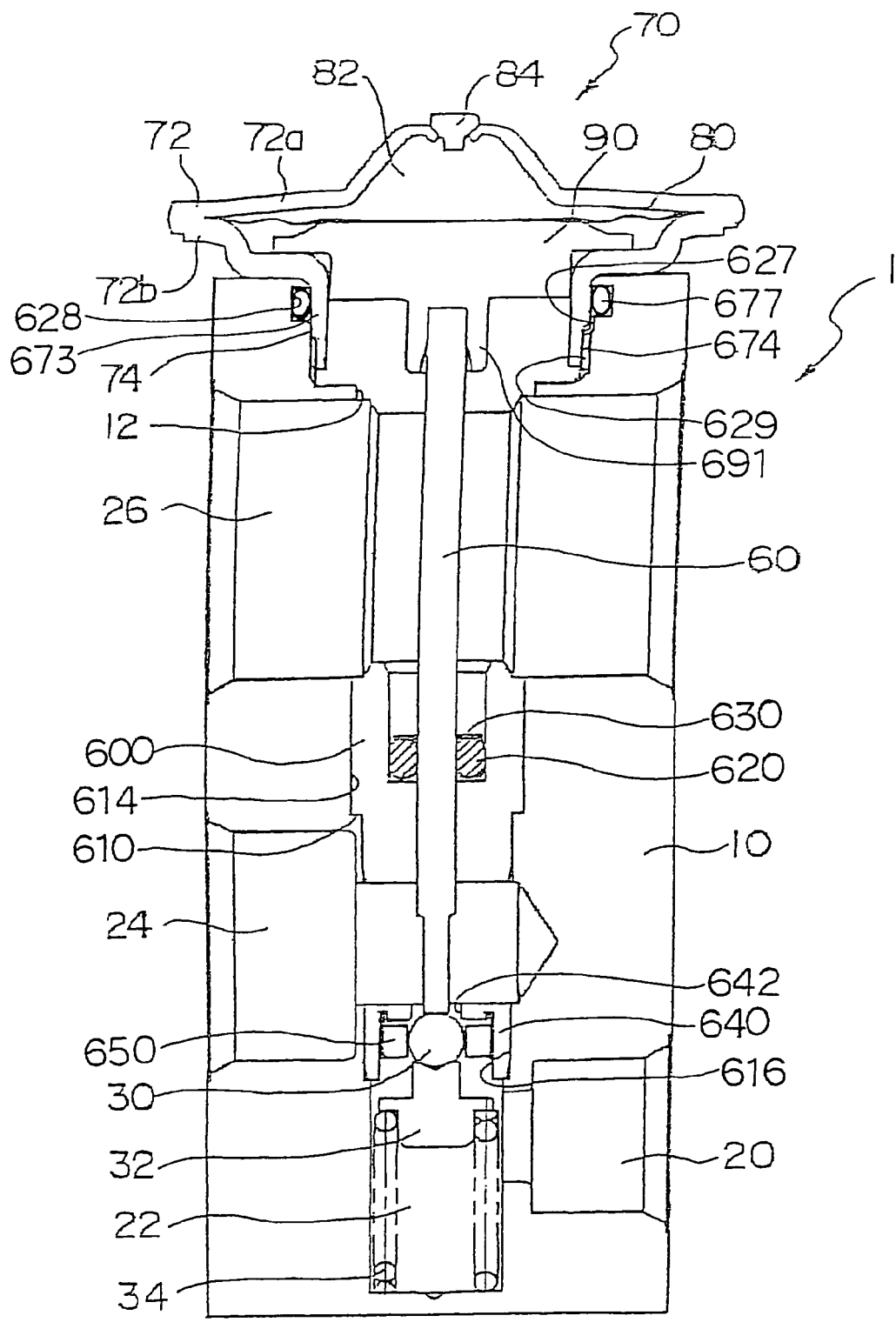
FIG. 22 is a sectional view of an expansion valve of Example 7 of the present invention.
Figure 23:
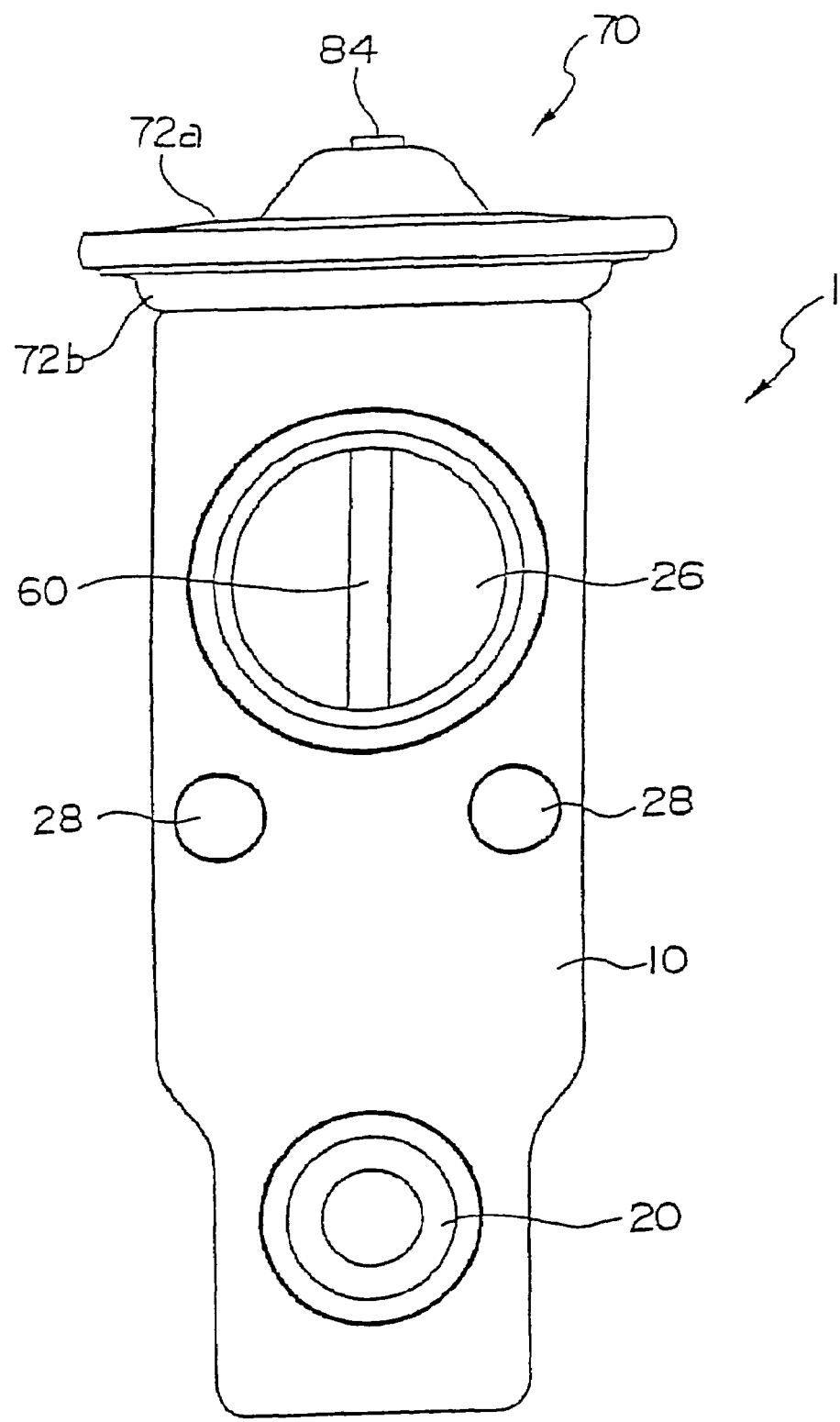
FIG. 23 is a right side view of FIG. 22.

FIG. 22 is a sectional view of an expansion valve of Example 7 of the present invention, and FIG. 23 is a right side view of FIG. 22 of the same.

The expansion valve, the whole of which is denoted by reference number 1, has the prismatic valve body 10 formed of an aluminum alloy and the like, and the valve body 10, which is provided with through holes 28 for mounting, is formed with the first passage 20 into which a high-pressure refrigerant flows.

The first passage 20 communicates with the bottomed valve chamber 22, and an orifice member 640 is fixed under pressure at the opening of the valve chamber 22.

In the valve chamber 22, the spherical valve element 30 is installed to the support member 32 by welding, and the support member 32 always urges the valve element 30 toward the orifice member 640 by means of the spring 34.

The orifice member 640 has an opening 642 in a central part to form a flow path for refrigerant between the orifice member 640 and the valve element 30.

In an inner-diameter part of the orifice member 640, a vibration isolating member 650 is fitted to prevent the valve element 30 from vibrating.

The refrigerant having passed through the orifice member 640 is sent out to the evaporator side through the second passage 24.

The refrigerant returning to the evaporator is sent to the compressor side through the third passage 26.

In an end part on the side opposite to the valve chamber 22 of the valve body 10, the driving device 70 for the valve element 30, which is called a power element, is installed.

The power element 70 has the can body 72 in which the upper lid 72a and the lower lid 72b are welded integrally, and the diaphragm 80 is held between the upper lid 72a and the lower lid 72b.

The can body 72 is fixed to the valve body 10 by the threaded portion 74, and is sealed by an O-ring 677, which is a seal member.

Between the diaphragm 80 and the upper lid 72a, the pressure chamber 82 is formed, which is filled with a working fluid and is sealed by the plug 84.

On the side opposite to the pressure chamber 82 of the diaphragm 80, the stopper member 90 is disposed.

The refrigerant in the third passage 26 is introduced to the back surface of the stopper member 90 through the opening 12.

The stopper member 90 slides in response to the displacement of the diaphragm 80.

The stopper member 90 holds the operation rod 60, and the distal end of the operation rod 60 abuts on the valve element 30.

The displacement of the diaphragm 80 drives the valve element 30 via the operation rod 60 to control the flow path area between the valve element 30 and the orifice member 640.

A guide member 600 in which the valve body 10 is inserted under pressure has a stepped portion 610, and is positioned exactly with respect to the valve body 10 and is fixed.

In an inner-diameter part of the guide member 600, a ring-shaped seal member 620 is inserted, and is fixed by a fastener 630 such as a bush nut.

The seal member 620 inhibits the passage of refrigerant between the second passage 24 and the third passage 26.

The valve body 10 is formed with a driving device mounting hole 627 which communicates with the third passage 26 and is open to install the power element 70, and an annular groove 628 and an internal thread portion 629 are formed at the inner periphery of the driving device mounting hole 627 of the valve body 10.

On the lower lid 72b of the can body 72 of the power element 70, a cylindrical mounting seat 673 fitted in the driving device mounting hole 627 of the valve body 10 is formed integrally. At the outer periphery of a tip end part of the mounting seat 673 for the can body 72 of the power element 70, an external thread portion 674 threadedly engaged with the internal thread portion 629 of the driving device mounting hole 627 of the valve body 10 is formed, and the external thread portion 674 of the mounting seat 673 for the can body 72 of the power element 70 is threadedly engaged with the internal thread portion 629 of the driving device mounting hole 627 of the valve body 10, by which the power element 70 is threadedly fitted in the driving device mounting hole 627 of the valve body 10.

In the annular groove 628 of the driving device mounting hole 627 of the valve body 10, the O-ring 677 is arranged as a seal member that is in close contact with the outer peripheral surface of the mounting seat 673 for the can body 72 of the power element 70.

In the can body 72 of the power element 70, the diaphragm 80 displaced by sensing the temperature of refrigerant sent out of the evaporator and the stopper member 90 for transmitting the displacement of the diaphragm 80 to the operation rod 60 are provided. On the stopper member 90, a cylindrical hollow protrusion 691 is integrally formed in the center on the lower surface on the side opposite to the diaphragm 80, and a proximal end part of the operation rod 60 is fitted in the hollow protrusion 691 on the stopper member 90. The distal end of the operation rod 60 abuts on the valve element 30.

Next, the procedure for assembling this expansion valve will be explained.

First, the support member 32 to which the spring 34 and the valve element 30 have been welded is inserted into the valve chamber 22 through the opening 12 on the side on which the power element 70 of the valve body 10 is installed.

Then, an assembly of the orifice member 640, to which the vibration isolating member 650 has been attached, is inserted under pressure into an opening portion 616 of the valve chamber 22 through the opening 12.

To insert the assembly into the opening portion 616, an appropriate press-in tool is used, and the assembly is fixed by staking as necessary.

Next, the guide member 600 in which the operation rod 60 has been inserted is inserted under pressure into a stepped hole 614 in the valve body 10 through the opening 12.

The guide member 600 is positioned in the axial direction by the stepped portion 610.

As necessary, the guide member 600 is fixed by staking.

Finally, the O-ring 677 is fitted in the annular groove 628 of the driving device mounting hole 627 of the valve body 10, and the mounting seat 673 for the can body 72 of the power element 70 is fitted in the driving device mounting hole 627 of the valve body 10. The external thread portion 674 of the mounting seat 673 for the can body 72 of the power element 70 is threadedly engaged with the internal thread portion 629 of the driving device mounting hole 627 of the valve body 10 and is tightened, and accordingly an assembly of the power element 70 is threadedly engaged with the valve body 10 by the threaded portion 74, by which the assembly of the expansion valve 1 is completed.

According to the above-described configuration, the external thread portion 674 of the mounting seat 673 for the can body 72 of the power element 70 is threadedly engaged with the internal thread portion 629 of the driving device mounting hole 627 of the valve body 10 and is tightened, by which the power element 70 is installed in the driving device mounting hole 627 of the valve body 10, and the O-ring 677 is brought into close contact with the outer periphery of the mounting seat 673 for the can body 72 of the power element 70. Therefore, the leakage of refrigerant from between the inner periphery of the driving device mounting hole 627 of the valve body 10 and the outer periphery of the mounting seat 673 for the can body 72 of the power element 70 can be prevented surely by the O-ring 677.

Further, by rotating the external thread portion 674 of the mounting seat 673 for the can body 72 of the power element 70 in the tightening direction or the loosening direction with respect to the internal thread portion 629 of the driving device mounting hole 627 of the valve body 10, the power element 70 is moved vertically with respect to the driving device mounting hole 627 of the valve body 10, by which the operation rod 60 can be moved vertically together with the power element 70. A set value for starting the opening of the valve element 30 of the expansion valve 1 can be finely adjusted by the amount of engagement of the external thread portion 674 of the mounting seat 673 for the can body 72 of the power element 70 with the internal thread portion 629 of the driving device mounting hole 627 of the valve body 10.

What is claimed is:

1. An expansion valve comprising a valve body having a valve body hole extending substantially longitudinally therethrough, a first passage in communication with the valve body hole and formed in the valve body through which a high-pressure refrigerant passes, a bottomed valve chamber in communication with the valve body hole and formed in the first passage, a second passage in communication with the valve body hole and formed in parallel with the first passage in the valve body through which a refrigerant sent out to the evaporator side passes, a third passage in communication with the valve body hole and through which a refrigerant sent out from the evaporator side passes, and a guide member disposed in the valve body hole between the first passage and the third passage, wherein, in the guide member, a guide portion, which slidably guides an operation rod for opening and closing a valve element, and an orifice portion, which has a throttle portion for causing the valve chamber and the second passage to communicate with each other are formed integrally, a passage communicating with the second passage is formed between the guide portion and the orifice portion, the valve element is arranged so as to be opposed to the throttle portion, and the operation rod is driven by a driving device mounted on the valve body, the valve body hole has a first valve body hole portion having a first hole diameter and a second valve body hole portion having a second hole diameter smaller than the first hole diameter to form a valve body step, the valve body step disposed between the second passage and the third passage, and the guide has a first guide portion having a first guide portion diameter and a second guide portion having a second guide portion diameter being smaller than the first guide portion diameter to form a guide portion step, the guide sized to be slidably received by the valve body hole in a close-fitting relationship such that the first valve body hole portion receives the first guide portion, the second valve body hole portion receives the second guide portion and the valve body step and the guide portion step contact each other.

2. The expansion. valve according to claim 1, wherein the guide member forms the valve body and a positioning portion.

3. The expansion valve according to claim 1, wherein the orifice portion is inserted under pressure in the valve body.

4. The expansion valve according to claim 1, wherein the valve body step and the guide portion step contact each other forming a seal therebetween.

5. The expansion valve according to claim 1, wherein the abutting portion is fixed to the valve body by surface contact.

6. The expansion valve according to claim 1, wherein the orifice portion of the guide member forms the valve body and a positioning portion.

7. The expansion valve according to claim 1, wherein a seal groove is formed at the outer periphery of the orifice portion, and a ring seal is arranged in the seal groove.

8. The expansion valve according to claim 1 wherein the guide member is fixed by staking to the valve body.

9. An expansion valve comprising a valve body, a first passage formed in the valve body through which a high-pressure refrigerant passes, a bottomed valve chamber formed in the first passage, a second passage formed in parallel with the first passage in the valve body through which a refrigerant sent out to the evaporator side passes. a third passage through which a refrigerant sent out from the evaporator side passes, and a guide member arranged in an opening portion of the valve body, wherein, in the guide member, a guide portion, which slidably guides an operation rod for opening and closing a valve element, and an orifice portion, which has a throttle portion for causing the valve chamber and the second passage to communicate with each other are formed integrally, a passage communicating with the second passage is formed between the guide portion and the orifice portion, the valve element is arranged so as to be opposed to the throttle portion. and the operation rod is driven by a driving device mounted on the valve body, and wherein the guide member is provided with a vibration isolating member abutting on the operation rod.

10. An expansion valve comprising a valve body, a first passage formed in the valve body through which a high-pressure refrigerant passes, a bottomed valve chamber formed in the first passage, a second passage formed in parallel with the first passage in the valve body through which a refrigerant sent out to the evaporator side passes, a third passage through which a refrigerant sent out from the evaporator side passes, and a guide member arranged in an opening portion of the valve body, wherein, in the guide member, a guide portion, which slidably guides an operation rod for opening and closing a valve element, and an orifice portion, which has a throttle portion for causing the valve chamber and the second passage to communicate with each other are formed integrally, a passage communicating with the second passage is formed between the guide portion and the orifice portion, the valve element is arranged so as to be opposed to the throttle portion, and the operation rod is driven by a driving device mounted on the valve body, and wherein at least a part of a large-diameter portion of the guide member, which incorporates the vibration isolating member, is arranged in the third passage.

11. An expansion valve comprising a valve body having a valve body hole extending substantially longitudinally therethrough, a first passage in communication with the valve body hole and formed in the valve body through which a high-pressure refrigerant passes, a bottomed valve chamber in communication with the valve body hole and formed in the first passage, a second passage ui communication with the valve body hole and formed in parallel with the first passage in the valve body through which a refrigerant sent out to the evaporator side passes, a third passage in communication with the valve body hole and through which a refrigerant sent out from the evaporator side passes, and a guide member disposed in the valve body hole between the first passage and the third passage, wherein the valve body is formed with a driving device mounting hole which communicates with the third passage for mounting the driving device, an annular groove and an internal thread portion are formed at the inner periphery of the driving device mounting hole in the valve body, the driving device has a can body fixed to the driving device mounting hole in the valve body, the can body of the driving device is integrally formed with a cylindrical mounting seat fitted in the driving device mounting hole in the valve body, an external thread portion threadedly engaged with the internal thread portion of the driving device mounting hole in the valve body is formed at the outer periphery of a tip end part of the mounting seat of the driving device, and a seal member in close contact with the outer peripheral surface of the mounting seat of the driving device is arranged in the annular groove of the driving device mounting hole in the valve body, the valve body hole has a first valve body hole portion having a first hole diameter and a second valve body hole portion having a second hole diameter smaller than the first hole diameter to form a valve body step, the valve body step disposed between the second passage and the third passage, and the guide has a first guide portion having a first guide portion diameter and a second guide portion having a second guide portion diameter being smaller than the first guide portion diameter to form a guide portion step, the guide sized to be slidably received by the valve body hole in a close-fitting relationship such that the first valve body hole portion receives the first guide portion, the second valve body hole portion receives the second guide portion and the valve body step and the guide portion step contact each other.

12. The expansion valve according to claim 11, wherein the seal member is an O-ring.

13. The expansion valve according to claim 11, wherein, in the can body of the driving device, a diaphragm displaced by sensing the temperature of a refrigerant sent out of the evaporator and a stopper member for transmitting the displacement of the diaphragm to the operation rod are provided, a cylindrical hollow protrusion is integrally formed on the stopper member, a proximal and part of the operation rod is inserted in the hollow protrusion of the stopper member, and a distal end of the operation rod abuts on the valve element.

* * * * *